US010587350B2

(12) United States Patent
Rodriguez-Herrera et al.

(10) Patent No.: US 10,587,350 B2
(45) Date of Patent: *Mar. 10, 2020

(54) CALIBRATING A PROGRAMMABLE PHASE MATRIX AND CHANNEL EMULATOR AND PERFORMING MASSIVE MIMO ARRAY TESTING USING THE CALIBRATED PHASE MATRIX AND CHANNEL EMULATOR

(71) Applicant: Spirent Communications, Inc., San Jose, CA (US)

(72) Inventors: Alfonso Rodriguez-Herrera, Denton, TX (US); John Douglas Reed, Arlington, TX (US)

(73) Assignee: Spirent Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/430,239

(22) Filed: Jun. 3, 2019

(65) Prior Publication Data

US 2019/0288780 A1    Sep. 19, 2019

Related U.S. Application Data

(63) Continuation-in-part of application No. 15/782,769, filed on Oct. 12, 2017, now Pat. No. 10,313,034.

(51) Int. Cl.
*H04B 17/12*    (2015.01)
*H04B 17/14*    (2015.01)
(Continued)

(52) U.S. Cl.
CPC ........... *H04B 17/12* (2015.01); *H04B 7/0413* (2013.01); *H04B 7/0617* (2013.01); *H04B 17/14* (2015.01);
(Continued)

(58) Field of Classification Search
CPC .... H04B 17/12; H04B 17/14; H04B 17/0087; H04B 17/3911; H04B 17/3912; H04B 7/0413; H04B 7/0617
See application file for complete search history.

(56) References Cited

U.S. PATENT DOCUMENTS 5,548,820 A    8/1996    Victorin
6,236,363 B1    5/2001    Robbins et al.
(Continued)

OTHER PUBLICATIONS

U.S. Appl. No. 14/801,746—Response to Office Action dated Jul. 9, 2018 filed Aug. 23, 2018, 15 pages.
(Continued)

*Primary Examiner* — Syed Haider
(74) *Attorney, Agent, or Firm* — Haynes Beffel & Wolfeld LLP; Ernest J. Beffel, Jr.; Andrew L. Dunlap

(57) ABSTRACT

The disclosed systems and methods for conducted massive MIMO array testing uses an efficient method of utilizing hardware resources for emulating signals from a massive MIMO base station transceiver to a MIMO mobile unit as dictated by a channel model; and also for emulating signals from a MIMO mobile unit to a massive MIMO BS transceiver, as dictated by a channel model. The system uses a phase matrix combiner to emulate the angular behavior of the propagation using virtual probes, combined with a radio channel emulator to create the temporal, multipath, and correlation behavior of the propagation. Using a phase matrix function increases the number of antenna elements that can be utilized in a massive MIMO array emulation while keeping the required number of fading channels within the radio channel emulator at a reduced number, thus forming a cost effective, yet realistic test system for massive MIMO testing.

21 Claims, 16 Drawing Sheets
(8 of 16 Drawing Sheet(s) Filed in Color)

(51) Int. Cl.
*H04B 7/06* (2006.01)
*H04B 17/391* (2015.01)
*H04B 7/0413* (2017.01)

(52) U.S. Cl.
CPC ..... *H04B 17/3911* (2015.01); *H04B 17/3912* (2015.01)

(56) References Cited

U.S. PATENT DOCUMENTS

| | | |
|---|---|---|
| 6,349,218 B1 | 2/2002 | Nakagawa et al. |
| 6,571,082 B1 | 5/2003 | Rahman et al. |
| 6,952,455 B1 | 10/2005 | Banister |
| 7,224,941 B2 | 5/2007 | Liu |
| 7,324,588 B2 | 1/2008 | Green et al. |
| 7,395,060 B2 | 7/2008 | Liu |
| 7,398,056 B1 | 7/2008 | Ebert et al. |
| 7,508,868 B2 | 3/2009 | Chang |
| 7,715,844 B2 | 5/2010 | Bi et al. |
| 8,331,869 B2 | 12/2012 | Foegelle |
| 8,412,112 B2 | 4/2013 | Foegelle |
| 8,761,684 B2 | 6/2014 | Reed |
| 8,787,900 B2 | 7/2014 | Amine et al. |
| 8,793,093 B2 | 7/2014 | Mow et al. |
| 8,824,588 B2 | 9/2014 | Emmanuel et al. |
| 8,880,002 B2 | 11/2014 | Falck et al. |
| 8,912,963 B2 | 12/2014 | Mow et al. |
| 8,995,511 B2 | 3/2015 | Reed |
| 9,024,828 B2 | 5/2015 | Reed |
| 9,107,098 B2 | 8/2015 | Emmanuel et al. |
| 9,209,914 B2 | 12/2015 | Reed |
| 9,246,607 B2 | 1/2016 | Reed et al. |
| 10,033,473 B1 | 7/2018 | Kyrolainen et al. |
| 10,244,411 B2 | 3/2019 | Reed |
| 2003/0050020 A1* | 3/2003 | Erceg ............... H04B 7/04 455/101 |
| 2003/0124982 A1 | 7/2003 | Saari et al. |
| 2004/0259554 A1 | 12/2004 | Rappaport et al. |
| 2005/0085223 A1 | 4/2005 | Liu |
| 2005/0210308 A1* | 9/2005 | Best ............... G11C 29/02 713/503 |
| 2006/0148429 A1 | 7/2006 | Inogai et al. |
| 2006/0229018 A1 | 10/2006 | Mlinarsky et al. |
| 2006/0229020 A1 | 10/2006 | Mlinarsky et al. |
| 2006/0233111 A1 | 10/2006 | Wright |
| 2006/0252419 A1 | 11/2006 | Liu |
| 2007/0019769 A1 | 1/2007 | Green et al. |
| 2007/0236230 A1 | 10/2007 | Tanbakuchi et al. |
| 2007/0243826 A1 | 10/2007 | Liu |
| 2008/0056340 A1 | 3/2008 | Foegelle |
| 2008/0114580 A1 | 5/2008 | Chin et al. |
| 2008/0139195 A1 | 6/2008 | Marsyla et al. |
| 2009/0094492 A1* | 4/2009 | Music ............... G06F 11/261 714/715 |
| 2010/0177813 A1 | 7/2010 | Gessner |
| 2010/0285753 A1 | 11/2010 | Foegelle |
| 2011/0084887 A1 | 4/2011 | Mow et al. |
| 2011/0189962 A1 | 8/2011 | Kyosti et al. |
| 2011/0191090 A1 | 8/2011 | Kyosti et al. |
| 2011/0299570 A1 | 12/2011 | Reed |
| 2012/0098713 A1 | 4/2012 | Mow et al. |
| 2012/0225624 A1 | 9/2012 | Kyosti et al. |
| 2012/0275506 A1 | 11/2012 | Ding et al. |
| 2012/0282863 A1 | 11/2012 | Guo et al. |
| 2012/0309323 A1 | 12/2012 | Guo et al. |
| 2013/0027256 A1 | 1/2013 | Guo et al. |
| 2013/0210474 A1 | 8/2013 | Kyosti |
| 2013/0235962 A1 | 9/2013 | O'Keefe et al. |
| 2014/0126618 A1 | 5/2014 | Kobayashi et al. |
| 2014/0241408 A1 | 8/2014 | Sozanski et al. |
| 2015/0017928 A1 | 1/2015 | Griesing et al. |
| 2015/0255868 A1* | 9/2015 | Haddad ............... H01Q 3/267 342/368 |
| 2015/0325913 A1* | 11/2015 | Vagman ............... H01Q 3/2605 342/368 |
| 2016/0212641 A1 | 7/2016 | Kong et al. |
| 2016/0226709 A1 | 8/2016 | Chen et al. |
| 2016/0233970 A1 | 8/2016 | Reed |
| 2017/0222735 A1 | 8/2017 | Kawamura |
| 2017/0279546 A1 | 9/2017 | McGarry et al. |
| 2018/0034560 A1 | 2/2018 | Foegelle |
| 2018/0277928 A1 | 9/2018 | Hartenstein |
| 2018/0337738 A1 | 11/2018 | Wen et al. |
| 2019/0103665 A1 | 4/2019 | Yoo et al. |

OTHER PUBLICATIONS

U.S. Appl. No. 14/801,746—Notice of Alliowance dated Nov. 6, 2018, 7 pages.
U.S. Appl. No. 15/620,610—Response to Office Action dated Dec. 21, 2017, filed Mar. 20, 2018, 9 pages.
U.S. Appl. No. 15/620,610—Notice of Allowance dated Jul. 16, 2018, 5 pages.
U.S. Appl. No. 15/620,610—Notice of Allowance dated Aug. 9, 2018, 2 pages.
U.S. Appl. No. 15/620,610—Notice of Allowance dated Oct. 31, 2018, 21 pages.
U.S. Appl. No. 15/782,769—Office Action dated Nov. 2, 2018, 22 pages.
Meinila et al, D5.3: WINNER+Final Channel Models, Wireless World Initiative New Radio—Celtic Telecommunication Solutions, WINNER+, Version 1.0, Jun. 30, 2010, pp. 1-107.
Macom Technology Data Sheet, MAPS-010165, Digital Phase Shifter 6-Bit, 3.5-6.0 GHz, V3, MACOM Technology Solutions Inc., 8 pages, Jan. 19, 2017.
Darbari et al, "MIMO Channel Modelling (Miron Signal Processing)", pp. 77-117, University of Strathclyde, Glasgow, ISBN 978-953-7619-91-6, published by InTech, Mar. 1, 2010, www.intechopen.com.
Spirent Vertex Channel Emulator Technical Specifications, Aug. 29, 2017, 2 pages.
Spirent Vertex Channel Emulator Data Sheet, rev. D, Aug. 2017, 4 pages.
"Programmable Phase Shifters", HJ Technologies, 64 x 16-1024, http://www.haojintech.com/index.php/product/index/id/167.html, Oct. 2, 2017, 3 pages.
"Programmable Phase Shifters", HJ Technologies, 16 x 16-256, http://www.haojintech.com/index.php/product/index/id/167.html, Oct. 2, 2017, 3 pages.
Harris et al, "From MIMO to Massive Mimo", University of Bristol (U.K.): Ian Mings British Telecom (BT), Sep. 15, 2017, Microwave Journal, http://www.microwavejournal.com/articles/print/28974-from-mimo-to-massive-mimo, 10 pages.
"Introduction to Network Analyzer Measurements", www.ni.com/rf-academy, National Instruments, Mar. 5, 2014, pp. 1-44.
"5G Spectrum Public Policy Position", Nov. 2016, GSMA, London EC4n 8AF UK, www.gsma.com, pp. 1-7.
"MIMO Beamforming Test System", https://www.spirent.com/Products/MIMO_Beamforming_Test_System, Oct. 10, 2017, pp. 1-4.
Larsson et al, "Massive MIMO for Next Generation Wireless Systems", IEEE Communications Magazine, vol. 52, issue 2, Jan. 21, 2014, pp. 1-20.
Hoydis et al, "Massive MIMO in the UL/DL of Cellular Networks: How Many Antennas Do We Need?", IEEE Journal on Selected Areas in Communications, Institute of Electrical and Electronics Engineers, 2013, 31 (2), Jan. 8, 2014, pp. 160-171.
Bjornson et al, "Massive MIMO Systems with Hardware-Constrained Base Stations", Access Centre, Dept. of Signal Processing, KTH Royal Institute of Technology, Stockholm, Sweden, Mar. 19, 2014, pp. 1-5.
PCT/US2010/024202—International Search Report and Written Opinion dated Sep. 17, 2010, 11 pages.
Rusek et al, "Scaling Up MIMO: Opportunities and Challenges with Very Large Arrays", INFONET, GIST Journal Club, Mar. 21, 2013, IEEE Signal Processing Magazine, pp. 1-12.
Li et al, "Dynamic Beamforming for Three-Dimensional MIMO Technique in LTE-Advanced Networks", Wireless SIgnal Process-

(56) References Cited

OTHER PUBLICATIONS ing and Network Lab, Key Lab of Universal Wireless Communications (Ministry of Education), Beijing University of Posts and Telecommunications, Hindawi Publishing Corp., Intl. Journal of Antennas and Propagation, vol. 2013, Article ID 764507, http://dx.doi.org/10.1155/2013/764507, Jul. 4, 2013, pp. 1-9.
Raschkowski et al, "METIS Channel Models", d1.4", https://www.metis2020.com/wp-content/uploads/METIS_D1.4_v3_pdf.2015, Mobile and wireless communications Enablers for the Twenty-twenty information Society (METIS), Jul. 14, 2015, 223 pages.
Molisch et al, "Hybrid Beamforming for Massive MIMO—A Survey", IEEE Comm. Mag., vol. 55, iss. 9, 2017, Apr. 30, 2017, pp. 1-13.
PCT/US2010/024204—International Preliminary Report on Patentability dated Aug. 16, 2011, 5 pages.
U.S. Appl. No. 13/147,579—Preliminary Amendment dated Aug. 2, 2011, 9 pages.
U.S. Appl. No. 13/147,579—Office Action dated Mar. 13, 2014, 17 pages.
U.S. Appl. No. 13/147,579—Response to Office Action dated Mar. 13, 2014 filed Aug. 13, 2014, 13 pages.
U.S. Appl. No. 13/147,579—Notice of Allowance dated Nov. 24, 2014, 8 pages.
PCT/US2010/024204—International Search Report and Written Opinion dated Aug. 2, 2010 , 9 pages.
U.S. Appl. No. 14/801,746—Office Action dated Jun. 28, 2016, 14 pages.
Rumney, "LTE and the Evolution to 4G Wireless: Design and Measurement Challenges," Agilent Technologies Publication, Chapter 6: "Design and Verification Challenges", 2009, pp. 199-411.
"Move Forward to What's Possible in LTE," Agilent Technologies, Inc., Mar. 16, 2009, pp. 1-12, accessed at http://www.agilent.com/find/lte.
"Agilent 3GPP Long Term Evolution: System Overview, Product Development, and Test Challenges," Application Note, Agilent Technologies, Inc., Sep. 8, 2009, pp. 1-92, accessed at http://www.agilent.com/find/LTE.
"E6620 Wireless Communications Test Set," Agilent Technologies, Inc., Jun. 8, 2009, pp. 1-12, accessed at http://www.agilent.com/find/8960devicedesign.
Technical White Paper, "Long Term Evolution (LTE): A Technical Overview," Motorola, Inc., 2007, pp. 1-15, accessed at www.motorola.com.
Narandzic, et al., "Comparison of SCM, SCME, and WINNER Channel Models," IEEE, 2007, pp. 413-417.
Berger, Lars T., et al., "Geometry Based Other-Sector Interference Modelling for Downlink Systme Simulations", 2004, 5 pages.
Baum, Daniel S., et al., "An Interim Channel Model for Beyond-3G Systems", 2005, 5 pages.
Cita, "Test Plan for 2x2 Downlink MIMO and Transmit Diversity Over-the-Air Performance", Aug. 2015, 75 pages.
Huang, Kaibin, et al., "Spacial Interference Cancellation for Mulitantenna Mobile Ad Hoc Networks", Mar. 2012, 17pages.
Written Opinion of corresponding PCT Application No. PCT/US2010/024202, dated Sep. 17, 2010, pp. 1-4.
U.S. Appl. No. 14/801,746—Office Action dated Apr. 11, 2017, 11 pages.
U.S. Appl. No. 14/801,746—Response to Office Action dated Jun. 28, 2016 filed Sep. 9, 2016, 10 pages.
U.S. Appl. No. 14/801,746—Final Office Action dated Nov. 25, 2016, 13 pages.
U.S. Appl. No. 14/801,746—Response to Final Office Action dated Nov. 25, 2016 filed Feb. 21, 2017, 11 pages.
Reed, "MIMO OTA Antenna Measurements", CTIA Panel Session, Mar. 2011, Orlando.
Fundamentals of channel emulation, Mar. 15, 2012, octoScope, 225 Cedar Hill Street, Ste. 200, Marlborough, MA 01752 USA, www.octoScope.com.
Reed, "MIMO OTA Test Methods", CTIA Panel Session, May 2012, 32 pages, New Orleans, LA.
U.S. Appl. No. 15/620,610—Office Action dated Dec. 21, 2017, 9 pages.
Meinila et al., "D5.3: WINNER+ Final Channel Models", Celtic Telecommunication Solutions, CELTIC/CP5-026, WP5, Editor: Petteri Heino, Jun. 30, 2010, pp. 1-107.
U.S. Appl. No. 14/801,746—Response to Office Action dated Apr. 11, 2017 filed Aug. 10, 2017, 12 pages.
U.S. Appl. No. 14/801,746—Final Office Action dated Oct. 17, 2017, 19 pages.
U.S. Appl. No. 14/801,746—Response to Final Office Action dated Oct. 17, 2017 filed Apr. 9, 2018, 20 pages.
U.S. Appl. No. 14/801,746—Office Action dated Jul. 9, 2018, 18 pages.
U.S. Appl. No. 16/262,729—Office Action dated Aug. 15, 2019, 24 pages.
U.S. Appl. No. 15/782,769—Response to Office Action filed Nov. 16, 2018, 8 pages.
U.S. Appl. No. 15/782,769—Notice of Allowance dated Jan. 18, 2019, 16 pages.
U.S. Appl. No. 16/262,729—Response to Office Action dated Aug. 15, 2019 filed Aug. 30, 2019, 8 pages.

* cited by examiner

Downlink

| Point | Explanation | Loss [dB] | Level [dBm] |
|---|---|---|---|
| A | gNb output | 0 | 23 |
| B | Cable loss | 5 | 18 |
| C | Array gain | -19 | 37 |
| D | Cable loss | 5 | 32 |
| E | Matrix loss | 50 | -18 |
| F | Cable loss | 5 | -23 |
| G | Fader loss | 15 | -38 |
| H | Cable loss | 5 | -43 |

FIG. 7A

Uplink

| Point | Explanation | Loss [dB] | Level [dBm] |
|---|---|---|---|
| H | Output of UT | 0 | 23 |
| G | Cable loss | 5 | 18 |
| F | Fader loss | 15 | 3 |
| E | Cable loss | 5 | -2 |
| D | Matrix loss | 50 | -52 |
| C | Cable loss | 5 | -57 |
| B | Array gain | -19 | -38 |
| A | Cable loss | 5 | -43 |

FIG. 7B

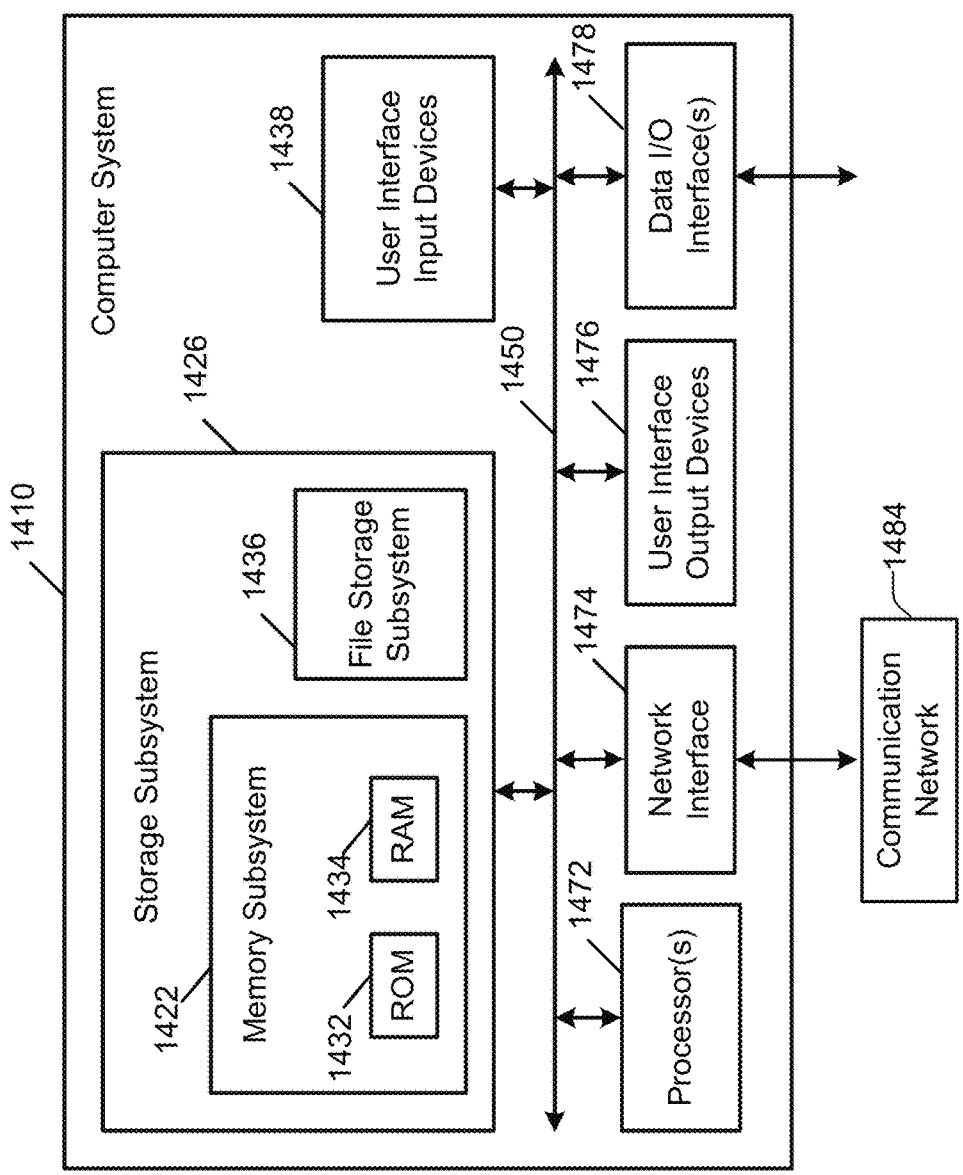
Fig. 14 Computer System

CALIBRATING A PROGRAMMABLE PHASE MATRIX AND CHANNEL EMULATOR AND PERFORMING MASSIVE MIMO ARRAY TESTING USING THE CALIBRATED PHASE MATRIX AND CHANNEL EMULATOR

RELATED APPLICATIONS

This application is a continuation-in-part of U.S. application Ser. No. 15/782,769, titled "MASSIVE MIMO ARRAY TESTING USING A PROGRAMMABLE PHASE MATRIX AND CHANNEL EMULATOR", filed 12 Oct. 2017, now U.S. Pat. No. 10,313,034 issued Jun. 4, 2019.

This application is related to U.S. patent application Ser. No. 15/620,610, entitled "OVER THE AIR TESTING FOR MASSIVE MIMO ARRAYS," filed Jun. 12, 2017, now U.S. Pat. No. 10,244,411, issued Mar. 26, 2019, which claims priority to U.S. Provisional Application No. 62/350,131, entitled "OVER THE AIR TESTING FOR MASSIVE MIMO ARRAYS," filed on Jun. 14, 2016, both of which are incorporated by reference herein.

This application is related to U.S. patent application Ser. No. 14/801,746, entitled "Massive MIMO Array Emulation," filed Jul. 16, 2015, now U.S. Pat. No. 10,243,628, issued Mar. 26, 2019, which is incorporated by reference herein.

This application is related to U.S. patent application Ser. No. 13/147,579, entitled "Emulation and Controlled Testing of MIMO OTA Channels," filed Aug. 29, 2011, now U.S. Pat. No. 8,995,511, issued Mar. 31, 2015, which is incorporated by reference herein.

BACKGROUND

Massive multiple-input multiple-output antenna techniques provide an effective means for significantly increasing the capacity of cellular communication systems while possibly reducing their energy consumption. Multiple-Input-Multiple-Output (MIMO) antenna techniques are key factors in achieving the high data rates promised by next-generation wireless technologies such as LTE (Long-Term Evolution), LTE-Advanced and $5^{th}$ generation technologies.

MIMO systems are designed to take advantage of spatial diversity available in the propagation environment. The spatial diversity is quantified by the correlation between antennas, a function of both the propagation environment and the antenna patterns. Under ideal conditions an M×N MIMO system (one using M transmitting antenna elements and N receiving antenna elements) can increase maximum data rates by a factor of min{M,N}times those available from a Single-Input Single-Output (SISO) system operating in the same bandwidth. In other words, a 4×2 MIMO system can (under ideal conditions) double the data rates available in a SISO implementation, while a 4×4 MIMO system can potentially quadruple those rates. However, classical array modeling via MIMO emulation is expensive and prohibitively complex to build, and channel emulators have a limited number of possible inputs.

Development of fifth generation technologies such as 5G wireless telecommunication systems is currently on-going in various organizations. One key differentiator of 5G networks is using massive MIMO to boost capacity by deploying very narrow beams in certain directions. Massive MIMO utilizes many antenna elements, and testing massive MIMO would theoretically require lots of hardware resources. A desire exists to minimize the needed hardware resources, due to both cost and space limitations in testing environments.

Performance testing of a 5G gNodeB (gNB) can be subdivided into over-the-air (OTA) and conductive test methods. These categories can be further subdivided into below 6 GHz and above 6 GHz testing. Many of the 5G frequency allocations are on sub 6 GHz bands.

An opportunity arises to provide systems and methods for conducted, massive MIMO array testing in multiple scenarios. In one case, downlink testing is achieved by emulating broadcast signals from a massive MIMO base station controller to a MIMO mobile unit consistent with a channel model; in another case, uplink testing is carried out by emulating signals from a MIMO mobile unit to a massive MIMO base station antenna array.

SUMMARY

One implementation of the disclosed technology teaches a method of emulating signals from a massive MIMO base station transceiver to a MIMO mobile unit as dictated by a channel model which includes, at a programmable radio phase shifter and combining matrix (PSM), conductively receiving antenna element driver signals from a base station transceiver and constructing virtual probe signals that represent line-of-sight and multi-pathing from a massive MIMO base station transceiver to a MIMO mobile unit, as dictated by the channel model, and then at a channel emulator, combining and applying spatial and temporal correlation to the virtual probe signals for conductive transmission to the mobile unit, thereby implementing the channel model. The disclosed method also includes the PSM constructing the virtual probe signals from the antenna element driver signals, by applying phase shifting and attenuation functions and combining the phase shifted and attenuated driver signals to produce the virtual probe signals at PSM outputs; the channel emulator combining the PSM outputs and applying spatial and temporal correlation to the virtual probe signals to produce channel emulator outputs; and conductively relaying the channel emulator outputs to antennas of the MIMO mobile unit.

Particular aspects of the technology disclosed are described in the claims, specification and drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The color drawings also may be available in PAIR via the Supplemental Content tab.

FIG. 7A shows a table of example link budget values for downlink and FIG. 7B shows an example link budget for uplink.

FIG. 14 is a simplified block diagram of a system for emulating signals from a massive MIMO base station transceiver to a MIMO mobile unit as dictated by a channel model.

DETAILED DESCRIPTION

Figure 1:
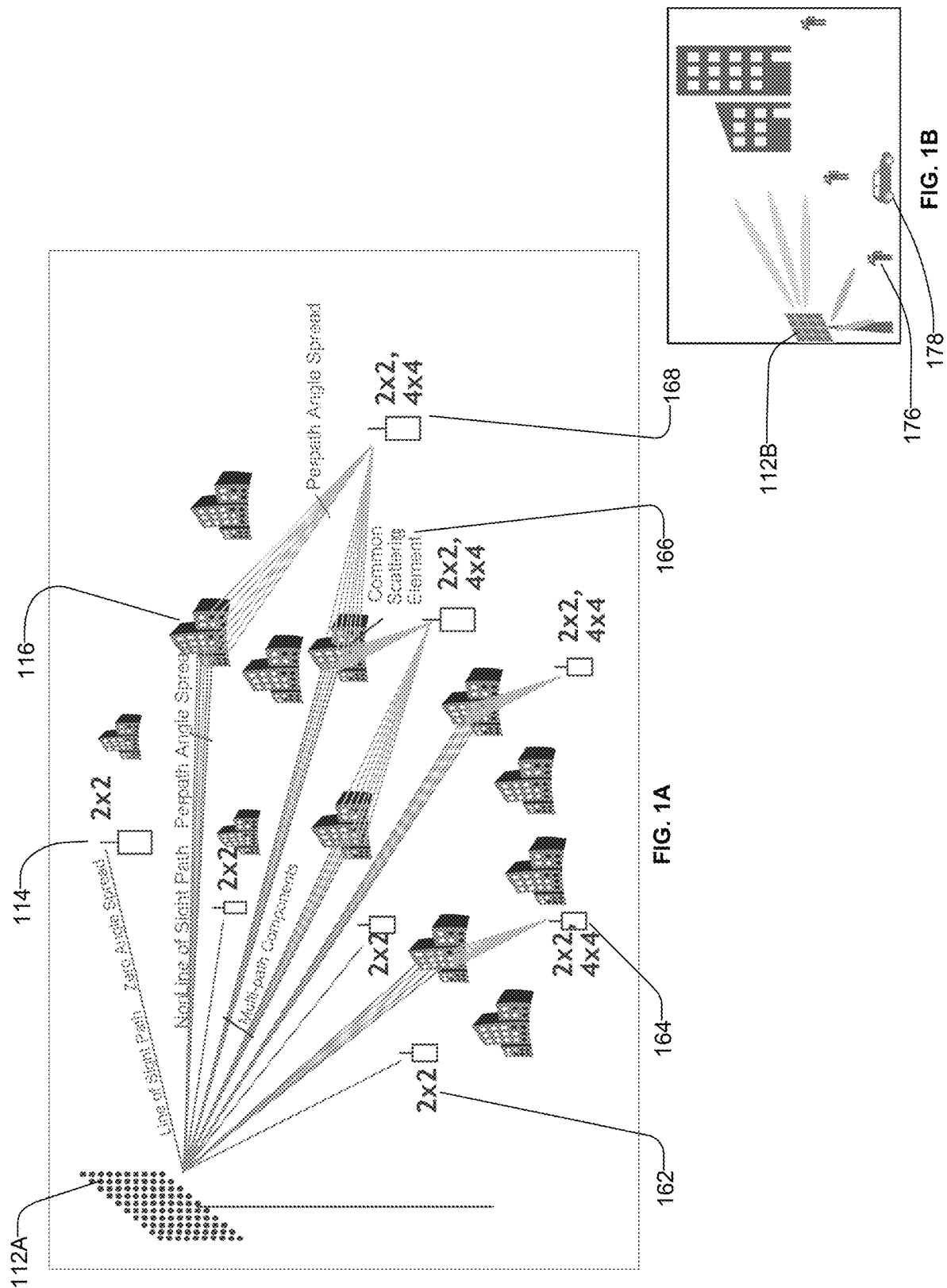
FIG. 1A shows an example massive MIMO array environment.
FIG. 1B shows examples of motion of user equipment in massive MIMO array environment.

The following description of the disclosure will typically be with reference to specific embodiments and methods. It is to be understood that there is no intention to limit the disclosure to the specifically disclosed embodiments and methods, but that the disclosure may be practiced using other features, elements, methods and embodiments. Preferred embodiments are described to illustrate the present disclosure, not to limit its scope. Those of ordinary skill in the art will recognize a variety of equivalent variations on the description that follows. Like elements in various embodiments are commonly referred to with like reference numerals.

The disclosed methods and systems for conducted, massive MIMO array performance testing are based on using a combination of a programmable radio phase shifter splitting and combining matrix (abbreviated PSM for phase shifter matrix) and a high fidelity radio channel emulator (CE) to emulate broadcast signals from a massive MIMO base station controller to a MIMO mobile unit and to emulate signals from a MIMO mobile unit to a massive MIMO base station antenna array, consistent with a channel model. Connecting the massive MIMO array of elements to the CE via a phase matrix allows for a simplification in the amount of hardware required for testing. The phase matrix provides a single phase-adjustable signal, connected between each input port to each output port, which can be used to model a single spatial direction, similar to the effect of having a test probe in an anechoic chamber. The single phase-adjustable signals of the virtual probe are then supplied to the CE. The CE can provide simulated mobility, signal correlation, and multipath spread to the test system. The virtual probes define the spatial clusters observed by the massive MIMO array, while the remainder of the channel is simulated in the CE and connected to the user equipment (UE). Thus with the combination of the phase matrix and channel emulator, a given spatio-temporal channel model can be created in a more efficient manner than can be achieved using the resources of the radio channel emulator alone. Conducted performance testing emulates an over-the-air (OTA) test using only bench-top lab equipment. The disclosed technology can also be applied to user equipment with a single antenna.

Massive MIMO systems are generally designed to communicate with one to many simultaneous users. FIG. 1A illustrates an example massive MIMO array environment, which contains a massive MIMO array of antennas (MM) 112A, and a mix of line-of-sight (LOS) 114, 162 and non-line-of-sight (NLOS) 116, 168 users scattered about a coverage area. For NLOS users, the propagation paths are obstructed in some way—creating a set of sub-components of the path, which are modeled by an angle spread (AS). The AS observed at the base station is usually quite narrow, being a few degrees in azimuth and elevation. The spread in azimuth is usually a bit more than the spread in elevation. The AS observed by the user equipment (UE) 168 is generally much higher due to the proximity to the scattering elements 116, 166. Sometimes a common scattering element may provide signal to more than one UE.

Massive MIMO array antennas may have a large number of radiating elements, usually in a rectangular grid 112A with element spacing equal to one half the wavelength of the carrier frequency. This spacing may vary, but is usually less than the wavelength of the carrier frequency. When dual polarized elements are used, often +/−45 degree antenna elements or 0/+90 degree elements are co-located, and spaced apart from the next pair of elements in the grid. These dual polarized elements enable the antenna to couple signals to and from the channel in vertical and horizontal polarization. Massive MIMO array antennas are valid for both uplink and downlink signals, and support time division duplexing (TDD) and frequency division duplexing (FDD). Packets can be interspersed between downlink packets and uplink packets. TDD operates in a single frequency band; frequency division duplex (FDD) utilizes paired frequency bands. Algorithms for creating virtual probes can utilize either TDD or FDD, as directed by the models.

Multipath propagation is often observed for NLOS users. This type of propagation is indicated by having more than one path that reaches the UE, usually with each path having different path delays and different angles of departure and arrival observed at the base station (BS) and the UE respectively. The disclosed technology emulates a mixed environment, having one or more users, which experiences one of several different propagation mechanisms, such as those described supra, in order to test a massive MIMO system.

FIG. 1B shows a typical deployment scenario for massive MIMO: a physical environment with multiple users in a multi-cluster radio channel environment, with massive MIMO array 112B, user movement 176, 178 and motion of the spatial clusters. A multi-cluster, multi-user channel model is usable as an example case to illustrate the test capabilities. User movement and motion of the spatial clusters are also described infra.

To model the complex propagation environment illustrated in FIG. 1B, including the user mobility, it is required to have channel emulation equipment that creates a virtual propagation environment. It is essential to create both a spatial environment that emulates cluster departure and arrival directions, and also a temporal model with the correct fading behavior as well as correlation between fading signals to evaluate the dynamically changing environment to test active antenna systems in gNBs.

The operation of the massive MIMO array antenna 112A is typically bi-directional, so both uplink and downlink signals are emulated. It is usually a time division duplex (TDD) system with the same carrier frequency used on the uplink and downlink, but it may also be a frequency division duplex (FDD) system, with different frequencies used on the uplink and downlink. UE can be mobile phones or emulated phones. A BS or BS emulator controls the UE, setting up a test mode, creating or simulating data, measuring throughput (TP), and monitoring both the uplink and downlink.

A typical 5G gNB will include a planar antenna array with 3D beamforming. In receive mode, the array can observe signal paths in azimuth and elevation on the uplink within the field of view of the array. A selected set of complex weights applied to the array elements allow the array to focus a beam in a selected direction according to the array factor. Significant processing power may be utilized to determine the complex weights used at the gNB array.

Since most 5G scenarios will utilize bi-directional Time Division Duplex (TDD), this approach is described in detail herein. In this case the same weights used for the receiver can also be used to transmit on the downlink, thus energizing the same paths that are determined by the gNB to connect to the UE. The channel model is defined by the departure geometry at the base station gNB, by the directions to the first bounce. The directions from the last bounce to the UE are also specified along with a path delay and Doppler shift. Specifying the departure and arrival directions of the path is sufficient to model double-directional geometric radio channels.

RF matrices can be used as analog beam formers, but they cannot introduce channel propagation impairments like multipath, Doppler, UE antenna correlation, and noise. For that purpose, the disclosed system and method include a channel emulator. By emulating virtual probes, a hardware simplification can be accomplished to reduce the overall amount of test equipment. This disclosed technology also describes the methods needed to calibrate the system in phase and amplitude. Additionally, this disclosure describes the methods to control cross-polarization ratio of an emulated propagation channel. Virtual probe techniques are also described.

Figure 2:
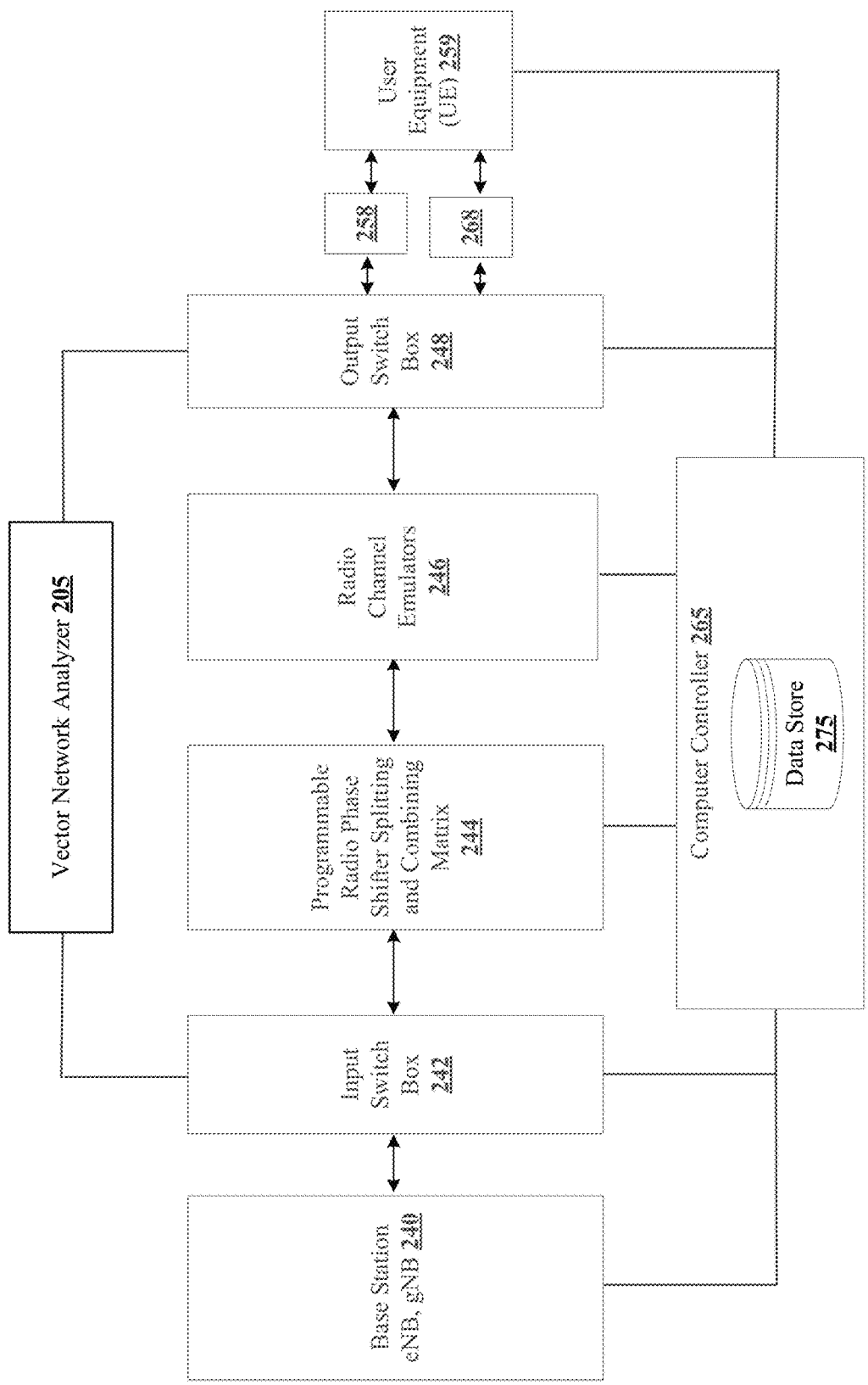
FIG. 2 is a block diagram of a system for massive MIMO antenna array and MIMO mobile unit testing and for system calibration.

FIG. 2 illustrates the block diagram for disclosed system 200 for conducted massive MIMO array testing, including programmable radio phase shifter splitting and combining matrix 244 (abbreviated PSM for phase shifter matrix) that provides a single phase adjustable connection between each input port to each output port and radio channel emulators 246 that provide simulated mobility, signal correlation, and multipath spread to the array testing system.

Continuing with the description of FIG. 2, system 200 also includes switch box 242 for routing signals between vector network analyzer (VNA) 205 and programmable radio phase shifter splitting and combining matrix 244, as well as for routing signals between eNodeB (eNB), gNodeB (gNB) base station 240 and matrix 244. Switch box 248 routes signals between user equipment (UE) 259 combiners 258, 268 and radio channel emulators 246, and between VNA 205 and radio channel emulators 246. VNA 205 characterizes programmable radio phase shifter splitting and combining matrix 244 and radio channel emulators 246 by measuring their network parameters, as a function of frequency, typically in continuous wave mode. At the time of this writing, commercial eNBs have at most 8 antenna ports; so the need for an RF matrix is greatly diminished, since current channel emulators can handle those cases.

System 200 also includes computer controller 265 that includes software that controls programmable radio phase shifter splitting and combining matrix 244, radio channel emulators 246, VNA 205 and switch boxes 242, 248 for synchronizing testing operations. Additionally, software is utilized for phase calibration of programmable radio phase shifter splitting and combining matrix 244, including enabling each link individually, measuring the phase, and storing the measurements in data store 275 for use in calibration calculations, described further infra.

Figure 3B:
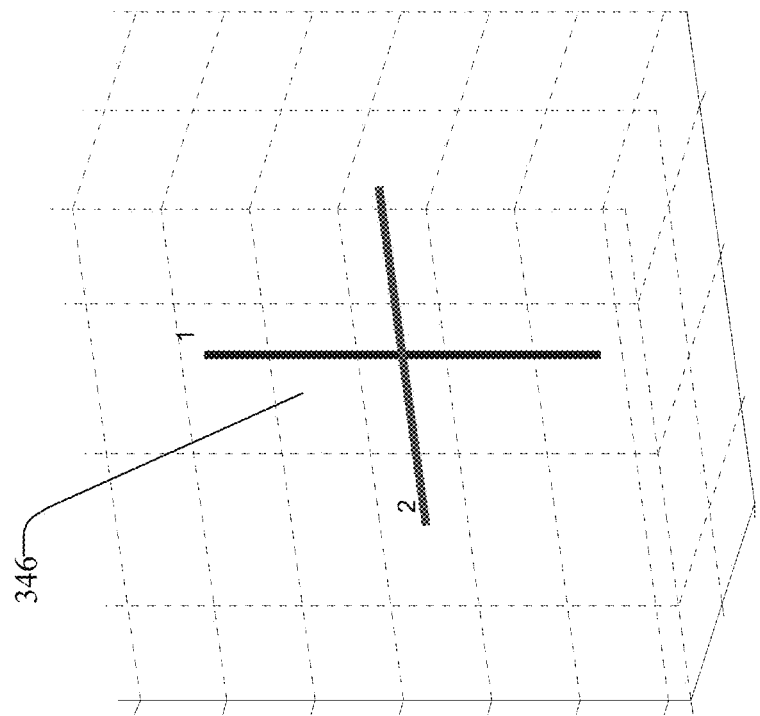
FIG. 3B shows example user equipment array elements.
Figure 3A:
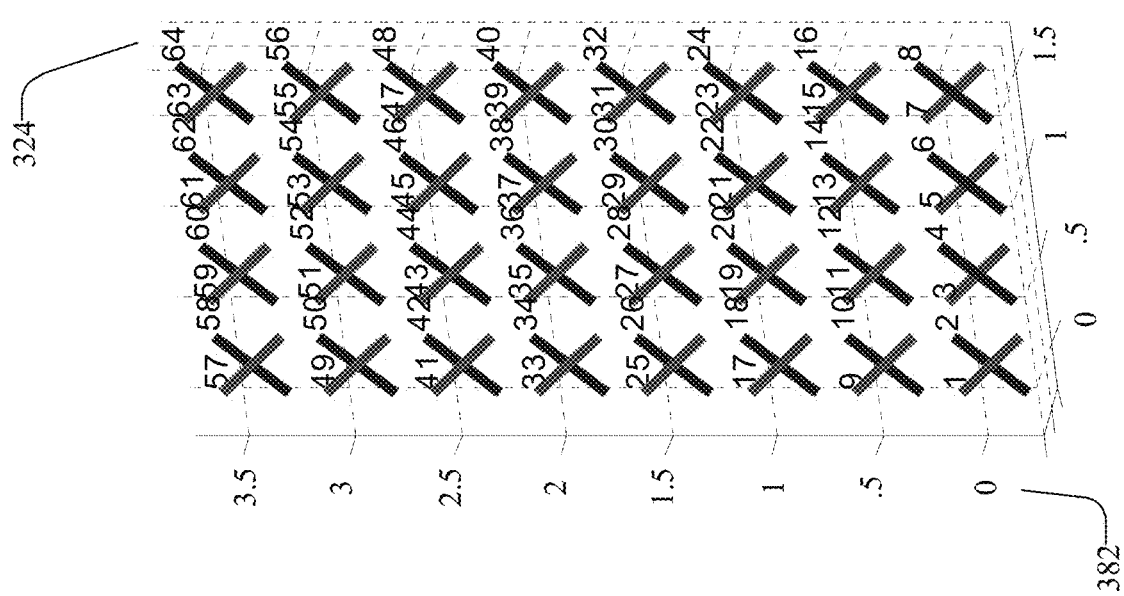
FIG. 3A shows a 2D planar array example having 8×4 dual polarized base station array elements.

For gNB testability, a specific predefined channel model is selected, having specific azimuth and elevation angles defined for each path component. FIG. 3A shows a 2D planar array example having 8×4 dual polarized base station array elements: one through sixty-four 324 with dimensions 382 in wavelengths Each of the slanted left (\) and slanted right (/) elements form separate beam patterns. When the array observes the channel model in the far field, a scanning algorithm or other technique may be used to determine the path directions. FIG. 3B shows example user equipment array elements number one and two 346. Virtual probes are also defined by the orientation and number of array elements number one and two 346.

When a path is measured over-the-air (OTA), the signal will be observed from its physical direction, as supplied by a probe in a test chamber, typically via a two element (+) dual polarized probe with separate vertical (V) and horizontal (H) polarizations. For a conducted model, the signal must be supplied by a virtual probe that is formed by a matrix of phases representing the far field response of the array. When a conducted measurement is made, a gain and phase calibration process is required, described infra. Then cables are connected to each physical antenna port. The actual array elements are normally bypassed with this approach, so the element's pattern must be incorporated into the signals provided to the array ports. To simplify the example, an ideal isotropic response is assumed for all array elements in this example use case; however other pattern shapes can be used. An isotropic antenna is a hypothetical lossless antenna that has equal radiation in all directions. It is ideal and not physically realizable, and is often taken as a reference for expressing the directive properties of actual antennas.

Figures 4A, 4B:
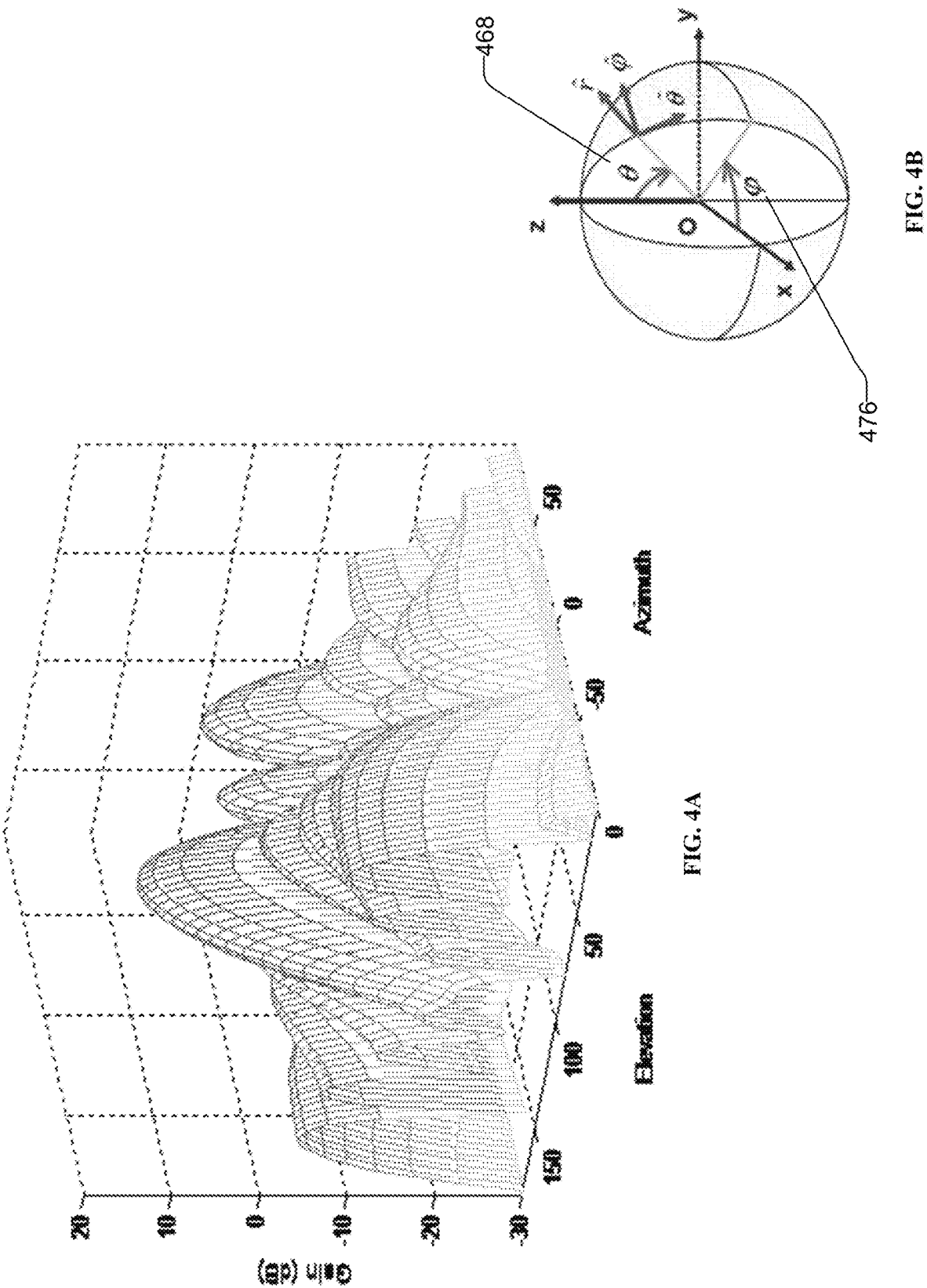
FIG. 4A illustrates the 2D beam pattern which has an azimuth beam at −30.7 degrees, and an elevation angle of 91.8 degrees.
FIG. 4B illustrates azimuth and elevation angles in a rectangular coordinate system.

Each of the slanted left (\) and slanted right (/) elements form a separate beam pattern. FIG. 4A illustrates the 2D beam pattern which has an Azimuth beam at −30.7 degrees, and an elevation angle of 91.8 degrees. Several side lobes are present as expected, with the elevation dimension having significantly more resolution as observed by the narrower pattern and additional slide-lobes compared with the azimuth dimension, due to the array geometry. FIG. 4B shows a reference coordinate plot that includes the relationship between elevation theta 468 and azimuth phi 476. A value of zero for theta is vertical on the z axis.

Massive MIMO testing using a traditional conducted connection would require a very large number of radio channels from the testing equipment. This is virtually impossible with commercially available channel emulator hardware due to the size and cost of the equipment, which is not easily scaled up to array sizes that are being proposed for 5G, with as many as 256 elements or more. Thus, there is a desire to minimize the needed hardware resources due the cost and space limitations in laboratory environment.

The purpose of the disclosed test system is to create an environment in which multiple users can be tested in a multi-cluster radio channel environment. Some of the users are desired users and some may be interfering users. Several system parameters, including capacity gain, link margin, and control of interference are evaluated by using massive MIMO arrays. The measurement quantifies the improvement expected from having very narrow beams resulting in higher signal-to-noise ratio for desired users as well as steering the null vectors into directions with unwanted users, that is, interferers.

Note that the number of inputs (M) to the programmable radio phase shifter splitting and combining matrix 244 is generally larger than number of outputs (N), providing a considerable savings in the CE resources required to emulate the dynamic behavior of a radio channel. This can be compared to hybrid beamforming where antenna element count is larger than AD converter count. The construction of programmable radio phase shifter splitting and combining matrix 244 consists of M splitters of size N with outputs connected to N combiners of size M, having an adjustable phase element on each input to output connection. It is also possible to include a programmable attenuator along with the adjustable phase element on each input to output connection.

Figure 5:
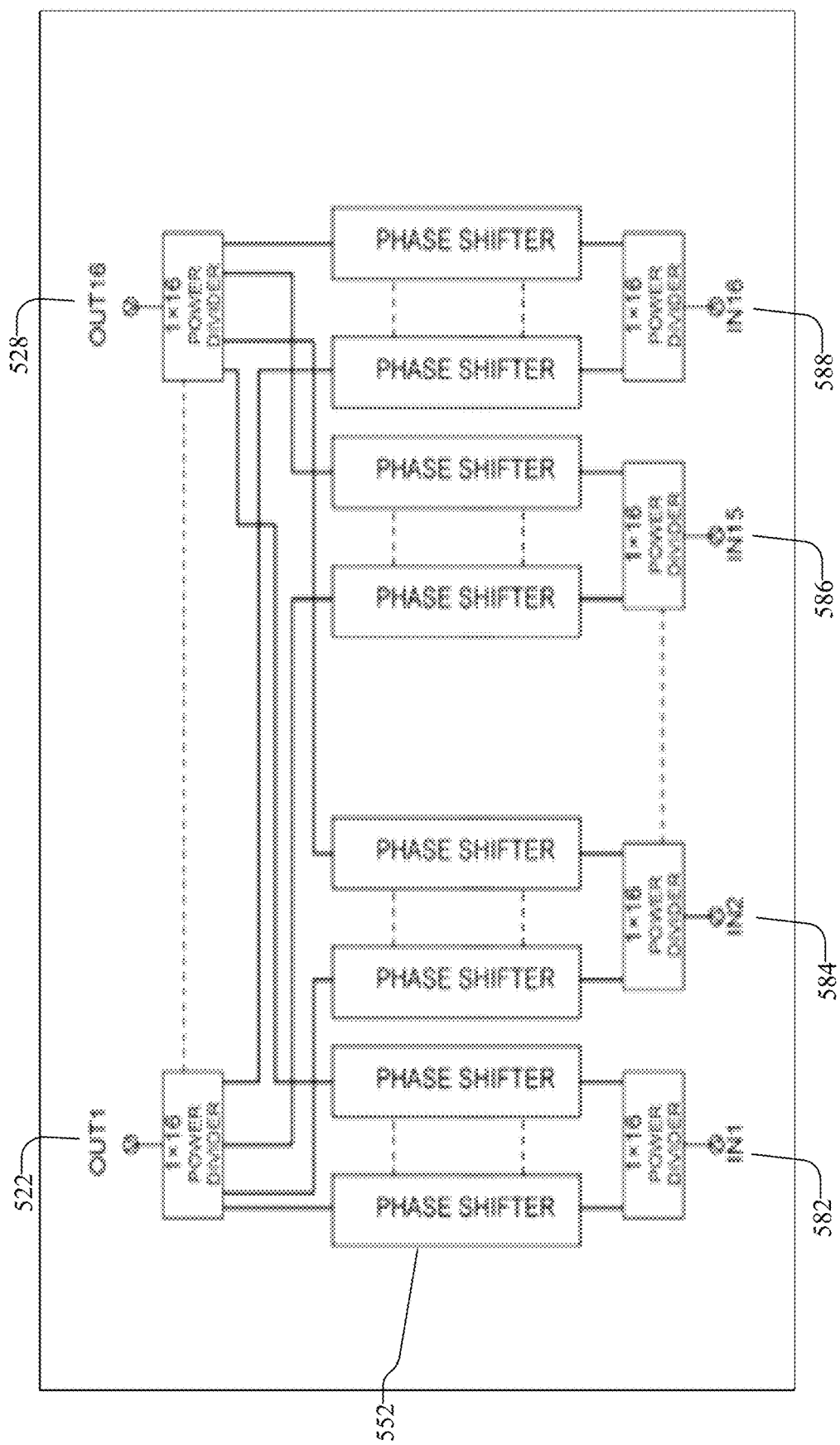
FIG. 5 shows an example programmable radio phase shifter splitting and combining matrix.

FIG. 5 shows an example programmable radio phase shifter splitting and combining matrix 244 that includes sixteen power divider inputs 582, 584, 586, 588, also referred to as splitters and sixteen power divider outputs 522, 528, also referred to as combiners. The terms 'splitter' and 'combiner' are usable interchangeably.

Phase shifter matrix 244 includes a phase matrix function, implemented with a set of phase shifters 542, which provides only gain and phase control to each input to output pair. Thus, without a delay element, only a single spatial characteristic can be emulated for each virtual probe. However multiple paths with unique temporal and delay characteristics can be modeled using the channel emulators 246 representing multipath that originates within the same path direction from the base station 240 (BS). Modeling spatial clusters in this way enables the use of the phase shifter matrix 244 as a pre-processor to the channel emulators 246, wherein the phase shifter matrix 244 can connect the BS array to the virtual probes. The virtual probes are then applied to the CE, where fading, path powers and delay, and cross polarization (XPR) are applied to complete the channel model. The phase matrix function can be utilized as a frontend pre-processor for downlink from a base station to a mobile unit, and as a backend post-processor for uplink from a MIMO mobile unit to a base station.

A link budget is used for accounting of all of the gains and losses from the transmitter, through the medium to the receiver in the system. It accounts for the attenuation of the transmitted signal due to propagation, as well as the antenna gains, feedline and miscellaneous losses. Randomly varying channel gains such as fading are taken into account by adding some margin depending on the anticipated severity of its effects. FIG. 7A shows a table of example link budget values for downlink and FIG. 7B shows an example link budget for uplink, representing the losses as described for points A through H. The signal loss in dB of the phase matrix is highly dependent on the number of input-output ports in phase shifter matrix 244.

External software included in computer controller 265 controls programmable radio phase shifter splitting and combining matrix 244 and channel emulators 246 such that the operation is synchronized. Thus, temporal realization of radio channel is connected to appropriate spatial realization of the radio channel.

One key consideration in the disclosed methods for utilizing phase shifter matrix 244 is that the phase change is quantized. This introduces phase quantization noise to beam forming. The results of a sensitivity test comparing steps of 2.8 and 5.2 degrees, for an 8-element test, show that the beam forming ability is similar to that for reproducing the array factor expected when continuous phase beam forming is utilized.

Figure 8B:
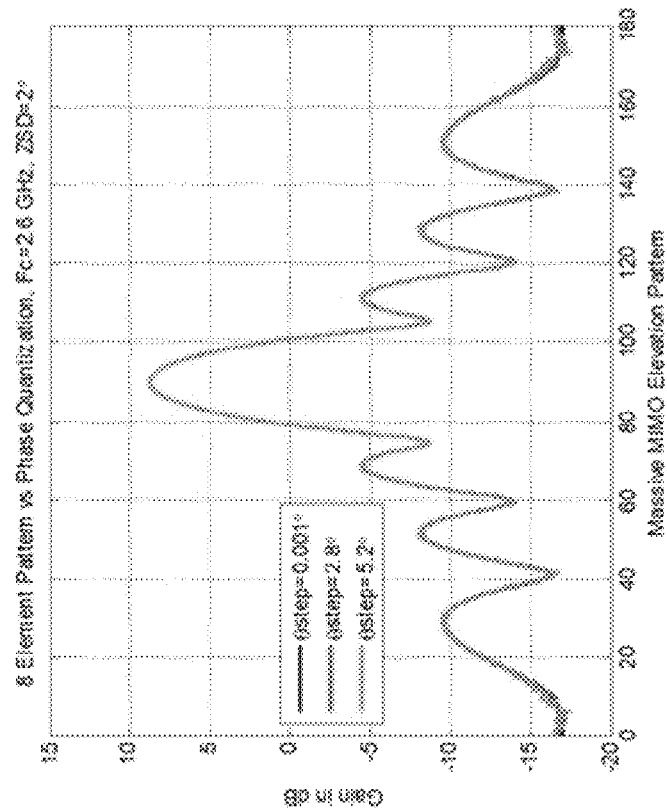
FIG. 8A depicts the effect of quantization noise to the beam former in LOS case and FIG. 8B depicts the effect of quantization noise to the beam former in the NLOS propagation case.
Figure 8A:
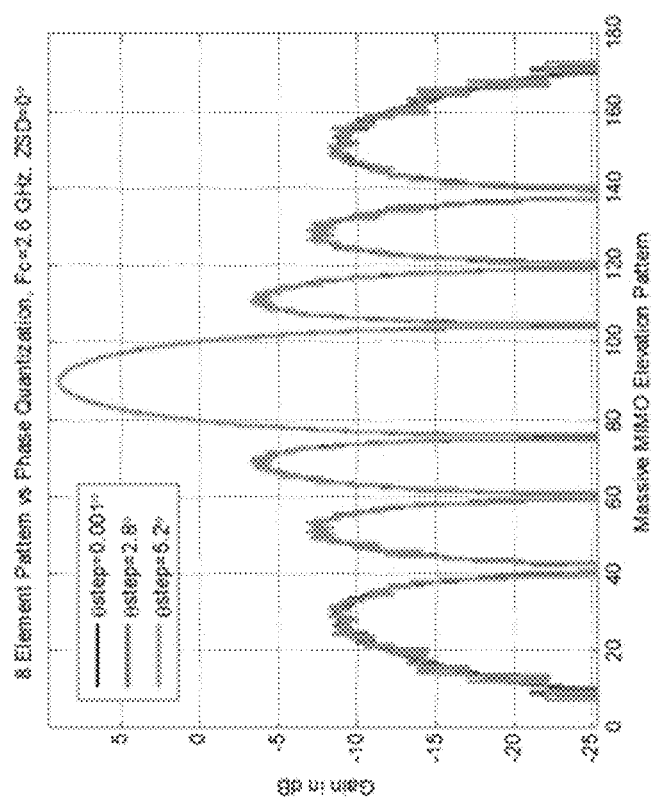

FIG. 8A depicts the effect of quantization noise to the beam former in LOS case and FIG. 8B depicts the effect of quantization noise to the beam former in the NLOS propagation case. For the NLOS condition, an angle spread of 2 degrees is shown to fill in the pattern nulls and reduce the sensitivity to phase step quantizing, since the angle spread is essentially an averaging window that is applied to the expected array factor. Even though the phase matrix is controlled in discrete steps, the performance is very close to a continuous phase beam forming, as shown in the simulation results in FIG. 8A and FIG. 8B. This result holds for much larger numbers of array elements, as well. Results have been measured and compared to theoretical expectations for a classical beamforming example using a 16 element uniform linear array (ULA) with 0.5 k element spacing, and programmable radio phase shifter splitting and combining matrix 24 programmed with the phase given by $$\phi_i = \frac{2\pi d_i}{\lambda}\sin(\theta)$$

where di is the element spacing and θ is the angle of departure (AoD), to emulate an array response.

Before the disclosed methods and systems can be used, phase calibration is needed to ensure the correct position in 3D of each virtual cluster. The process of phase calibration begins by disabling all links from input to outputs. Then, each possible link is enabled on an individual basis using switch box 242. The phase is measured with the aid of vector network analyzer (VNA) 205 and entered into data store 275.

The phase and amplitude calibration of a signal generation path that emulates interaction between a massive MIMO antenna array and a MIMO mobile unit includes path-by-path phase calibration of programmable radio phase shifter and combining matrix 244 (PSM) that passes multiple channels of signals through a channel emulator, without using the channel emulator to mix channels. The PSM passively shifts phase of each radio signal input routed to each radio signal output, according to input paired to output phase parameters, and passively attenuates each radio signal input routed to each radio signal output, according to input paired to output attenuation parameters. Then the calibration process includes adjusting input amplitude using the channel emulator in an amplitude equalization mode to reduce the amplitude difference to within a predetermined spread; and then path-by-path phase calibration of the channel emulator while the channel emulator is in the amplitude equalization mode.

Figure 6:
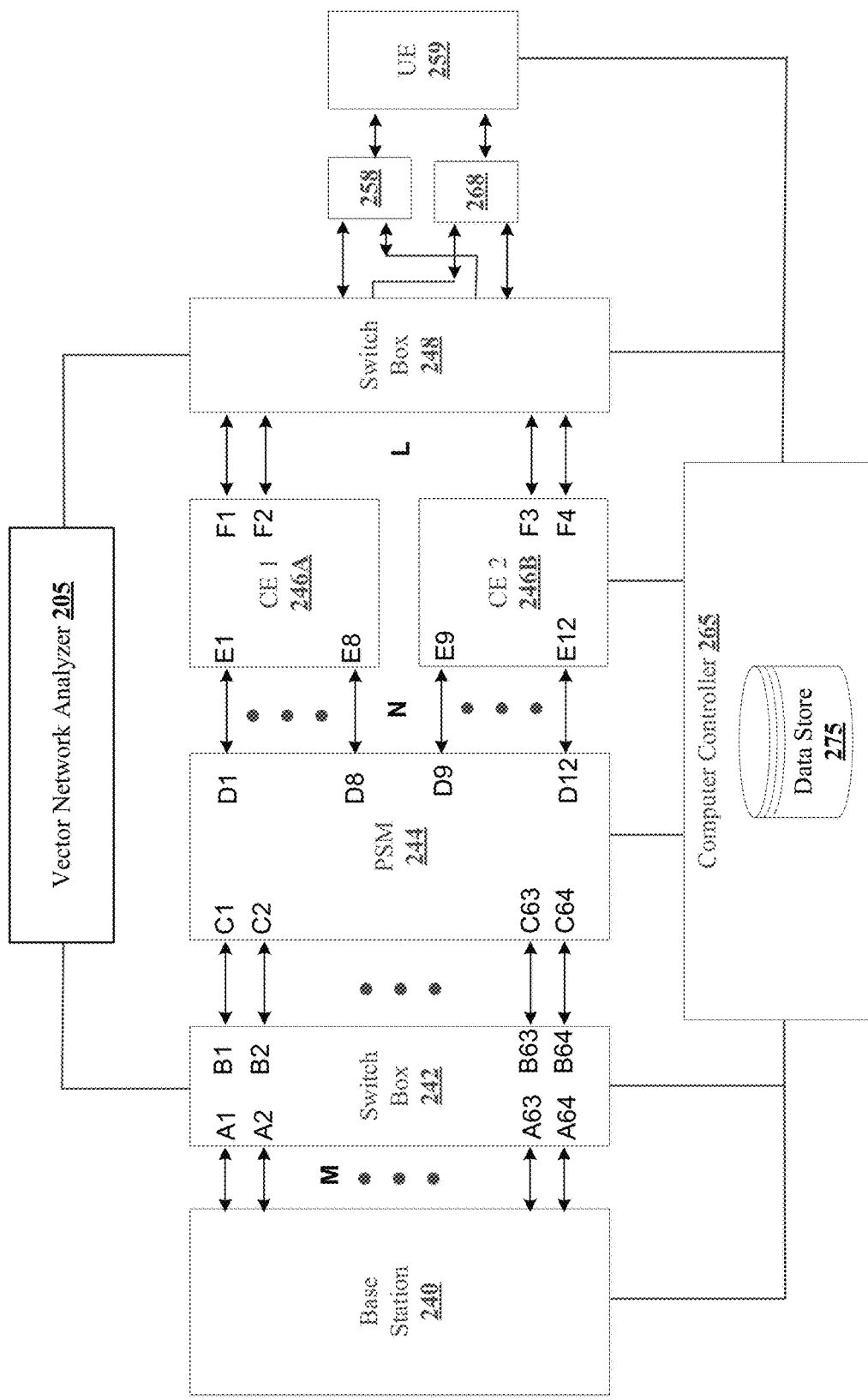
FIG. 6 shows a block diagram for calibration.

FIG. 6 shows a block diagram for calibration. In a more detailed example, the following steps are usable for calibrating PSM 244. First create a link budget to set the CE 246A, 246B input powers appropriately. Then CE input power will be equal to VNA 205 power-switch box insertion loss −RF matrix single path insertion loss. If this value is below −50 dBm, set the input power to −50 dBm. Next, set the outputs of CE 246A, 246B to −20 dBm to attain the best SNR in phase measurements. Set the VNA span to 1 MHz, and apply averaging. This can be done by the instrument, or it can be done with software by processing the measured samples. Next, begin phase calibration of the RF matrix PSM 244 by enabling each radio link path individually, and measuring the phase for that link. For example, switch to link path A1-B1-C1-D1-E1-F1 and measure phase for that link; then enable path A1-B2-C2-D1-E1-F1 and measure the phase for that link. Continue through the remaining link paths, with the same process. After completing all of the input paths, one at a time, complete the measured calibration for the first CE input by adding a delta phase to each path in order to create a phase match to a reference phase. Repeat the process described until all CE inputs are calibrated. The number of CE inputs depends on the number of clusters to be emulated and the number of UEs in the system.

Continue with the following steps for calibrating: use switch box 242 to route the signal of VNA 205 in continuous wave mode, to all RF matrix inputs. Autoset the CE 246A, 246B inputs to correct any amplitude imbalance of the PSM 244 RF matrix and execute input phase calibration. The CE needs to have a default channel propagation condition.

At the end of the process, a first radio link is chosen as the reference, and all of the other links add the corresponding phase that makes them coherent with the reference. For the calibration system presented in FIG. 6, the gNodeB base station 240 has M=64 ports, the PSM 244 RF Matrix has N=12 output ports, and the CE has L=4 outputs ports.

Emulating the MIMO channel is done with radio channel emulators 246 which supply spatial and temporal correlation to many predefined propagation paths. Numerous channel model proposals are being discussed in standards, which models could be utilized to define the number of spatial clusters observed by the massive MIMO array, given the array resolution and bandwidth that is available to observe the channel. Therefore, channel models will be selected based on the ability of the array to utilize them. The virtual probe allows a single path to be modeled, and additional virtual probes will enable spatial angle spread and multipath to be emulated. The virtual probe will be connected on one side of the channel emulator, and the UE connections will be on the other. Bi-directional paths will be utilized within the channel emulator and within the phase matrix.

Figure 9:
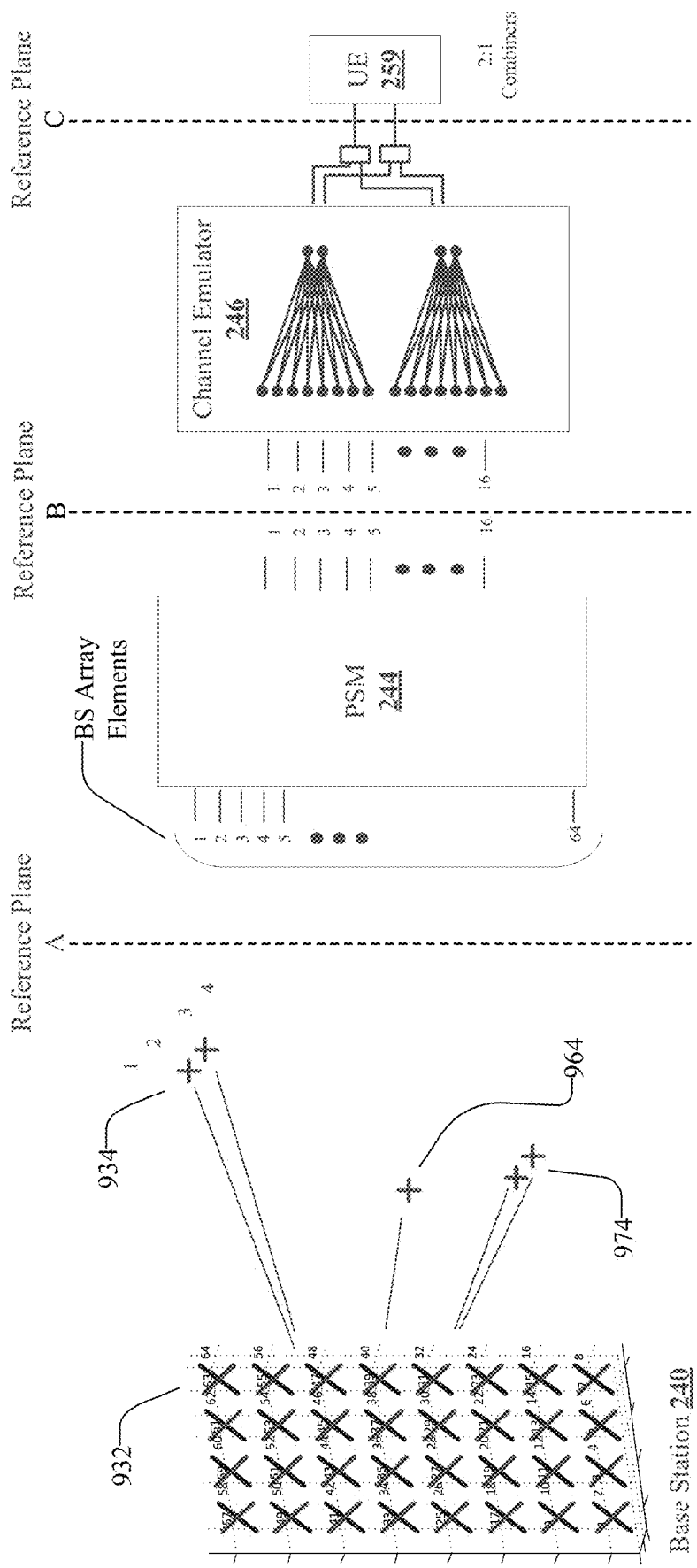
FIG. 9 shows an example system for constructing virtual probe signals that represent line-of-sight and multi-pathing.

FIG. 9 shows an example system for constructing virtual probe signals that represent line-of-sight and multi-pathing between a base station represented by antenna array 932 and user equipment (UE) 259, consistent with the channel model. A single path 964 can be emulated by programming the phase table of PSM 244 with 64 inputs to one output. Each output can emulate a virtual probe. Two outputs can emulate a dual polarized virtual probe 974 which can emulate a LOS cluster and two dual polarized probes 934 with a given spacing can emulate a NLOS cluster.

In an embodiment, during a calibration phase, a static channel model (e.g., without fading) can be implemented. This can be done by using the PSM 244 to phase calibrate the static channel model in the channel emulator 246 (e.g., the PSM 244 path-by-path calibrates a static channel model in the channel emulator 246 without fading). Generally, in a system, such as that illustrated in FIG. 9, there is no need to calibrate the phase beyond a reference plane between the PSM 244 and the channel emulator 246 (e.g., reference plane B in FIG. 9), because the channel emulator 246 can, for example, randomize the phase while adding fading. However, in some circumstances, such as when correlated fading is desired or when a static channel model without fading is implemented, phase calibration must be moved to a reference plane after the channel emulator 246 (e.g., reference plane C in FIG. 9). This is to avoid plane wave additions of a random phase (e.g., the creation of random values of power ranging from total constructive interference to total destructive interference). There are different ways to phase calibrate such a system all the way to the plane after the channel emulator 246. One way would be to use a brute force approach using a vector network analyzer, such as the VNA 206 of FIG. 6. However, there is a disadvantage to such an approach is that there would need to be 64×16×16× 8, which is 131,072, individual link phase measurements by the VNA 206. Another way would be to load the PSM 244 with a phase calibrated table, and enact input phase calibration in the channel emulator 246, which would result in an air interface independent approach that is faster. In other words, the phase table of the PSM 244 can be calibrated and the channel emulator 246 performs phase calibration of its inputs by iteratively selecting one pair of radio links and changing a relative phase between the radio links (of the pair) and measuring the resulting power at the output by looking for a peak or a null. This process is repeated until all radio links are phase aligned. This implementation of the static channel model in the channel emulator 246 can be combined with other techniques for calibrating a signal generation path that emulates interaction between a massive MIMO antenna array and a MIMO mobile unit.

Once the system described above is phase calibrated at the reference plane after the channel emulator 246, the system can be used to measure peak throughput by emulating the interaction between the massive MIMO antenna array and the MIMO mobile unit. Specifically, after calibration, a Butler matrix can be implemented by the system to create an optimum MIMO propagation scenario to achieve peak throughput. The Butler matrix can be implemented from reference plane A to reference plane C, as illustrated in FIG. 9.

Specifically, the Butler matrix can be implemented by programming the PSM 244 according to a first cascaded phase matrix and programming the channel emulator 246 according to a second cascaded phase matrix. Data for generating or forming the first and second cascaded matrices can be stored in a single table or multiple tables. One the PSM 244 and the channel emulator 246 are programmed with the respective first and second cascaded matrices, a resulting phase matrix is formed by combined first and second cascaded matrices (as implemented by the PSM 244 and the channel emulator 246, such that the phase matrix adheres to a Butler matrix structure.

The overall Butler matrix (or the phase matrix adhering to the Butler matrix structure) has N×M elements, where in this example N is 64 because there are 64 BS array elements and M is 8 because the channel emulator 246 has 8 outputs. The phases must be set in the PSM 244 and the channel emulator 246 so that the combination of the two is equal to the N×M Butler matrix. In mathematical terms $H_{Butler}=H_{PSM}H_{CE}$, where $H_{PSM}$ is a propagation matrix inside the phase matrix of the PSM 244, $H_{CE}$ is a propagation matrix inside the channel emulator 246, and $H_{Butler}$ is a propagation matrix with Butler characteristics.

Figure 15:
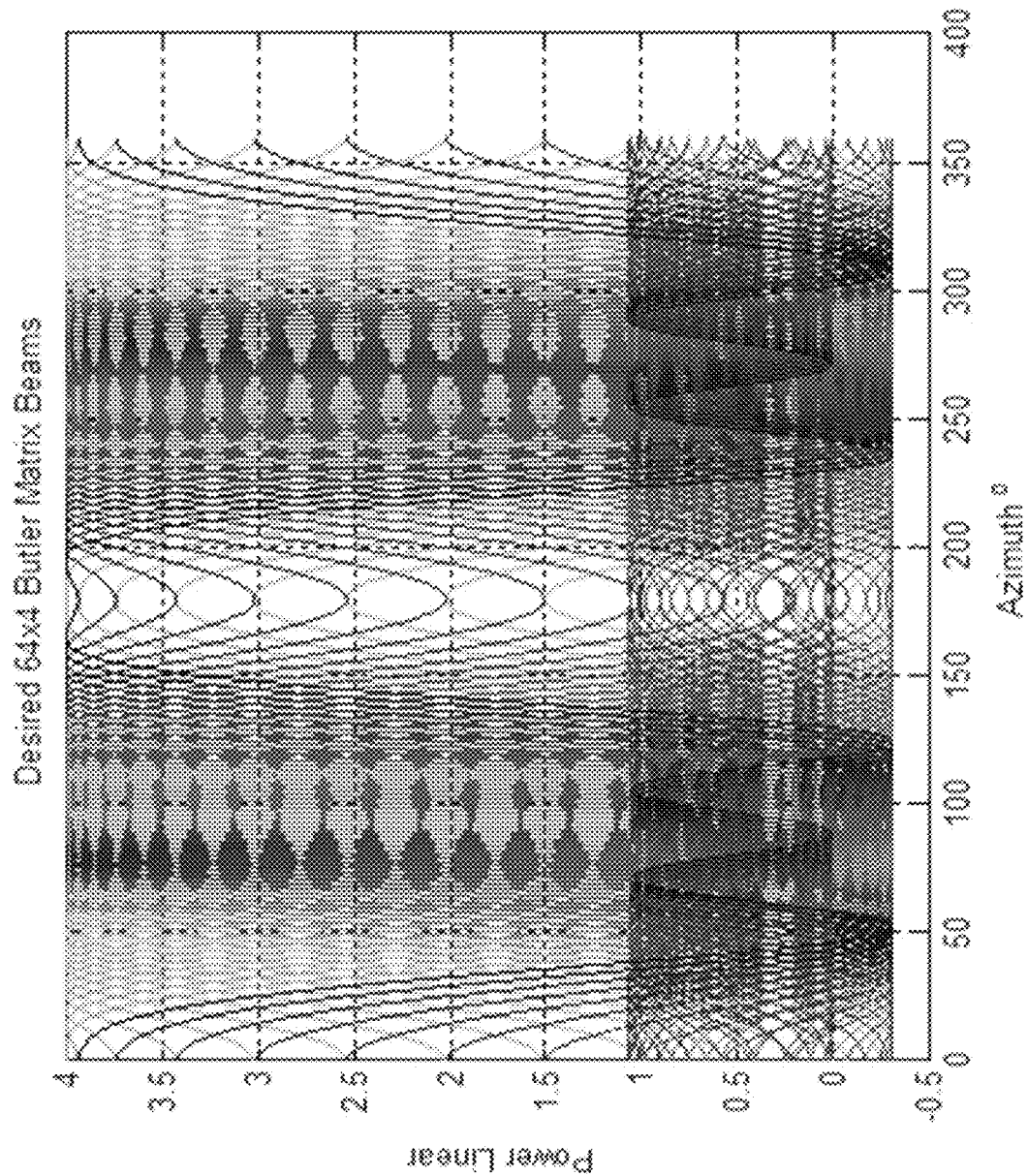
FIG. 15 is an example of beams of a resulting end-to-end Butler matrix.

By applying a pseudo-matrix inversion, one arrives at $H_{PSM}=H_{Butler}H_{CE}{}^{h}(H_{CE}H_{CE}{}^{h})^{-1}$, where h is a Hermitian or complex conjugate transpose operator. This equation provides the phases that need to be programmed inside the phase matrix as a function of the Butler phases, and the phases of the Channel Emulator 246. An example of beams of a resulting end-to-end Butler matrix of 64×4 is illustrated in FIG. 15.

Figure 16:
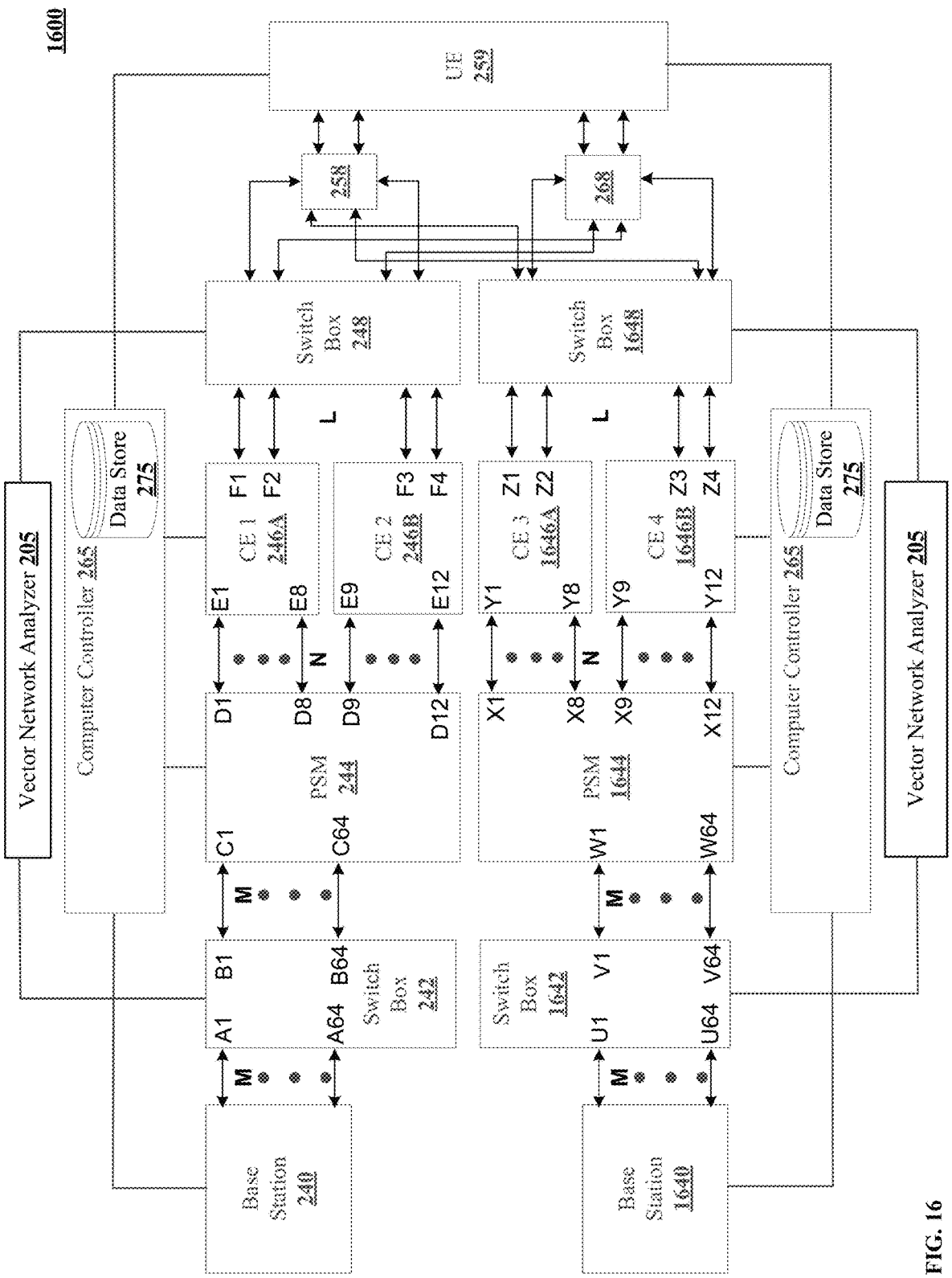
FIG. 16 shows a block diagram for calibration and emulation using a dual PSM structure for injecting interference.

Furthermore, the Butler matrix can be designed to be a rank "X" matrix, where X is an integer that represents the number of layers supported by the MIMO base station and/or MIMO mobile unit. X is given by min(number of transmit antennas, number of receive antennas). As an example, X is given by min(64,4), which results in X being 4; but it the number of receive antennas is 8, then X would be 8. Using the above-described static channel model implementation the PSM 244 and the channel emulator 246 can be configured to implement a phase matrix with rank 1, 2, 3, . . . X, that adheres to the Butler matrix structure, where X is calculated as previously described. Further, using such an implementation, the channel emulator 246 is able to orient its output to any arbitrary point in a three-dimensional space, where the 3D space can be defined using spherical coordinates. This implementation of the Butler matrix can be combined with other techniques for emulating interactions between a massive MIMO antenna array and a MIMO mobile unit Additionally, as illustrated in FIG. 16, a system 1600 is provided to include one or more virtual probes that can model an interference signal. FIG. 16 is similar to FIG. 6, except that the system 1600 includes an additional base station 1640, a switch box 1642, a PSM 1644, a channel emulator (CE) 3 1646A, a CE 4 1646B, and a switch box 1648. The additional base station 1640 is the same as or similar to the base station 240, the switch box 1642 is the same as or similar to the switch box 242, the PSM 1644 is similar to or the same as PSM 1644, the CE 3 1646A is the same as or similar to the CE 1 246A, the CE 4 1646B is the same as or similar to the CE 2 246B, and the switch box 1648 is the same as or similar to the switch box 248. The combiners 258, 268 also combine inputs received from the switch box 1648. Therefore, redundant descriptions of these elements are omitted here and can be found in the detailed descriptions of, at least, FIGS. 2, 6 and 9.

The base station 1640 introduces an interference signal from software and storage of the computer controller 265 and/or the data storage 275. The interference signal is generated and transmitted using, for example, 64 ports of the base station 1640. Via the switch box 1642, the PSM 1644, the CE 3 1646A, the CE 4 1646B, the switch box 1648 and the combiners 258, 269, the system 1600 combines the interference signal introduced by the base station 1640. This structure allows a user to inject interference signals and to adjust the injected interference signals to determine how the interference affects the downlink to the UE 259. The interference signals can also be injected during testing of the uplink. Further, the interference signal can be noise, such that the base station 1640, acts as a noise generator or the interference signal can be an air-interface specific interference signal that can be detected and cancelled by the UE.

During emulation of signals from the MIMO base station transceiver to the MIMO mobile unit, and vice versa, for fading scenarios when injecting an interference signal typically only the PSMs 244, 1644 needs to be calibrated and not any of the CE's 246A, 246B, 1646A, 1646B. However, there can be special cases when the CE's 246A, 246B, 1646A, 1646B still require calibration for fading scenarios, that being when the UE 259 is being evaluated for correlated signals. In contrast, during emulation of signals from the MIMO base station transceiver to the MIMO mobile unit, and vice versa, for non-fading scenarios (e.g., implementation of a static channel model) both the PSMs 244, 1644 and the CE's 246A, 246B, 1646A, 1646B are typically calibrated and the Butler matrix structure can also be implemented, as discussed above.

The additional PSM 1644 that is being used (in conjunction with base station 1640) is calibrated in order to keep the same signature as PSM 244. By having the PSM 1644 calibrated, the system 1600 will have the ability to direct the interference (noise) in a desired direction, such as in the direction of PSM 244. This dual PSM 244, 1644 structure provides directionality of the injected interference that is impossible and/or difficult to achieve without both PSMs 244, 1644.

Additionally, the vector network analyzer 205 and the computer controller 265 including the data store 275, connected to the base station 240, switch box 242, PSM 244, etc., can be the as or different from the vector network analyzer 205 and the computer controller 265 including the data store 275 connected to the base station 1640, switch box 1642, PSM 1644, etc.

This equation gives the phases that need to be programmed inside the phase matrix as a function of the well-known Butler phases, and the phases of the CE.

Figure 10:
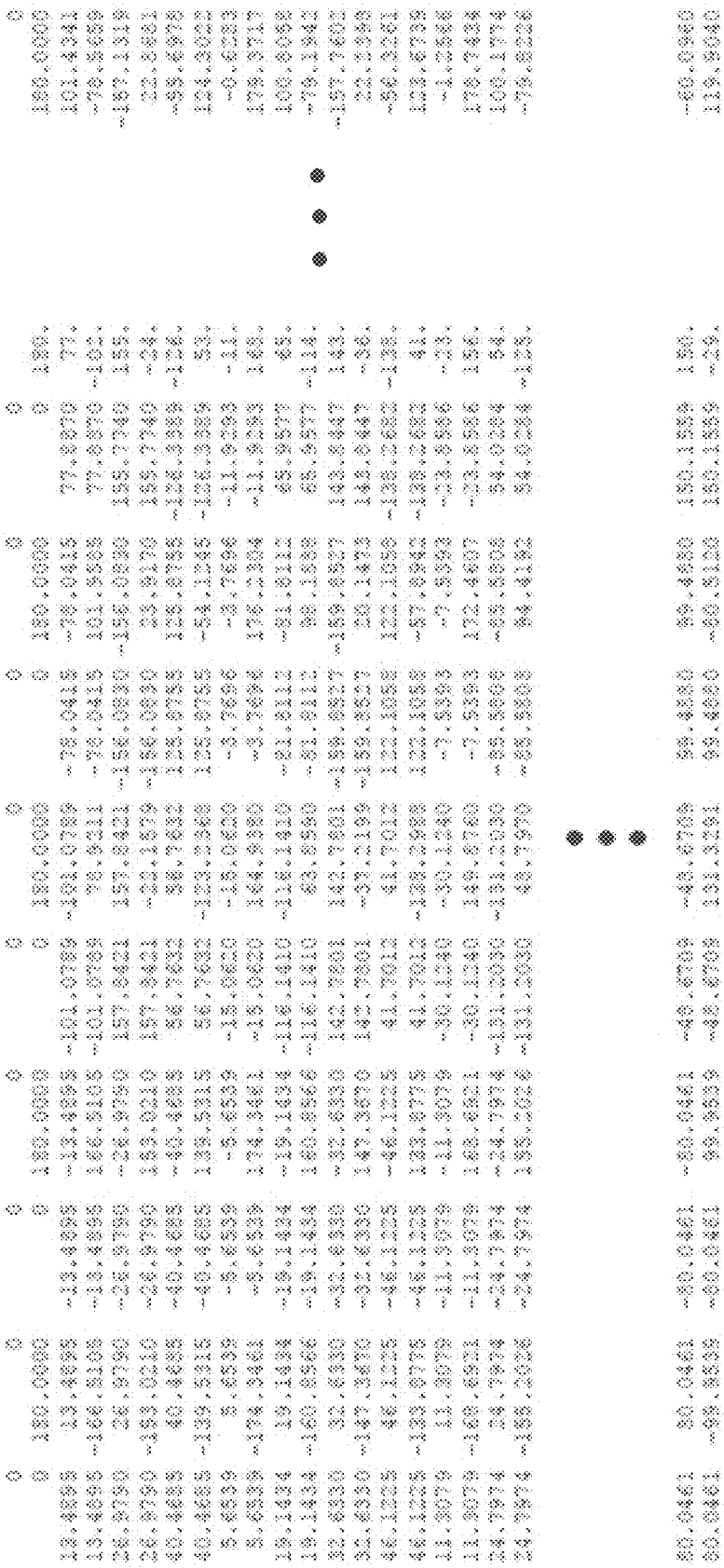
FIG. 10 shows an example phase array table of 64 rows and 16 columns.

The process of generating phases that correspond to an array response for each path is repeated to generate a table of phases, with the number of rows equal to the number of base station (BS) array elements and the number of columns equal to the number of virtual probe elements. Each polarization is modeled by a unique virtual probe element. FIG. 10 shows an example phase array table of 64 rows and 16 columns, for constructing 16 outputs from 64 base station array elements. The phases emulate a set of path arrival/departure angles in azimuth and elevation as observed by the array under test. The phases are determined by evaluation of a far-field assumption for the planar array. Polarization information is captured by the array and the probe polarizations. Each table column represents a different virtual probe output. The phases of the array are utilized to transmit the beam from PMS.

In one test use case, the phase matrix programming can be changed very quickly, within a few seconds, to simulate movement of virtual probes to a new location, and then performing a test to learn whether the base station antenna can track the user equipment. In another test, the phase matrix programming can be updated to add or remove a cluster, modify power balance between clusters, change delays or change Doppler. That is, changes can be simulated in the propagation environment by changing the virtual probes via programming of PSM 244 and the resulting virtual probes are usable for testing.

Figure 11B:
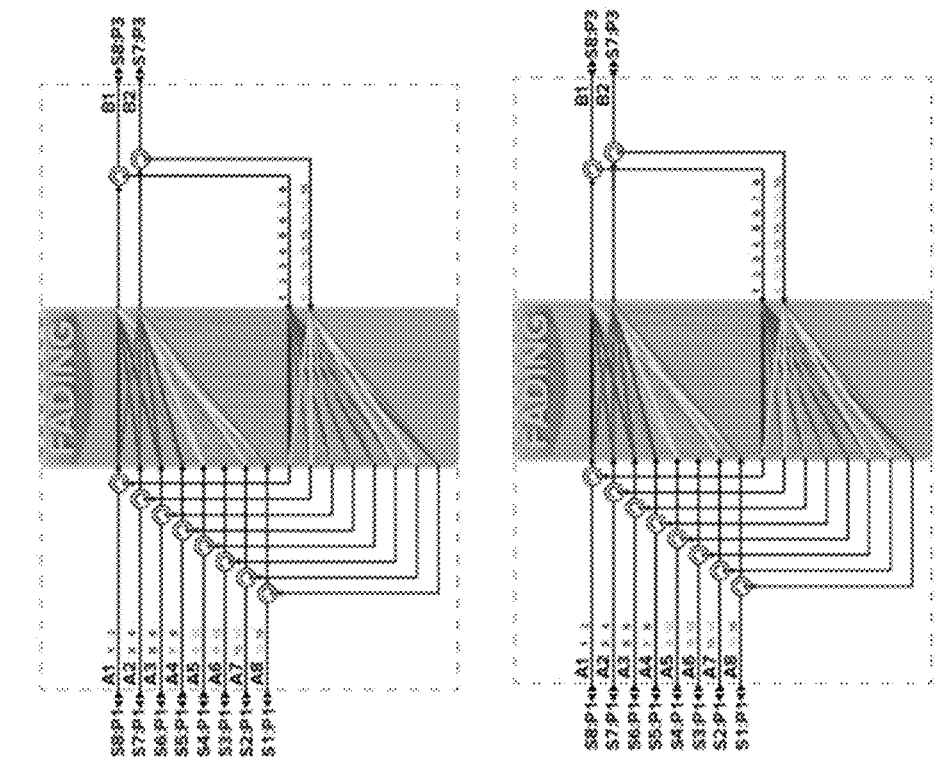
FIG. 11B shows example CE paths with details for two 8×2 bi-directional independent channel models.
Figure 11A:
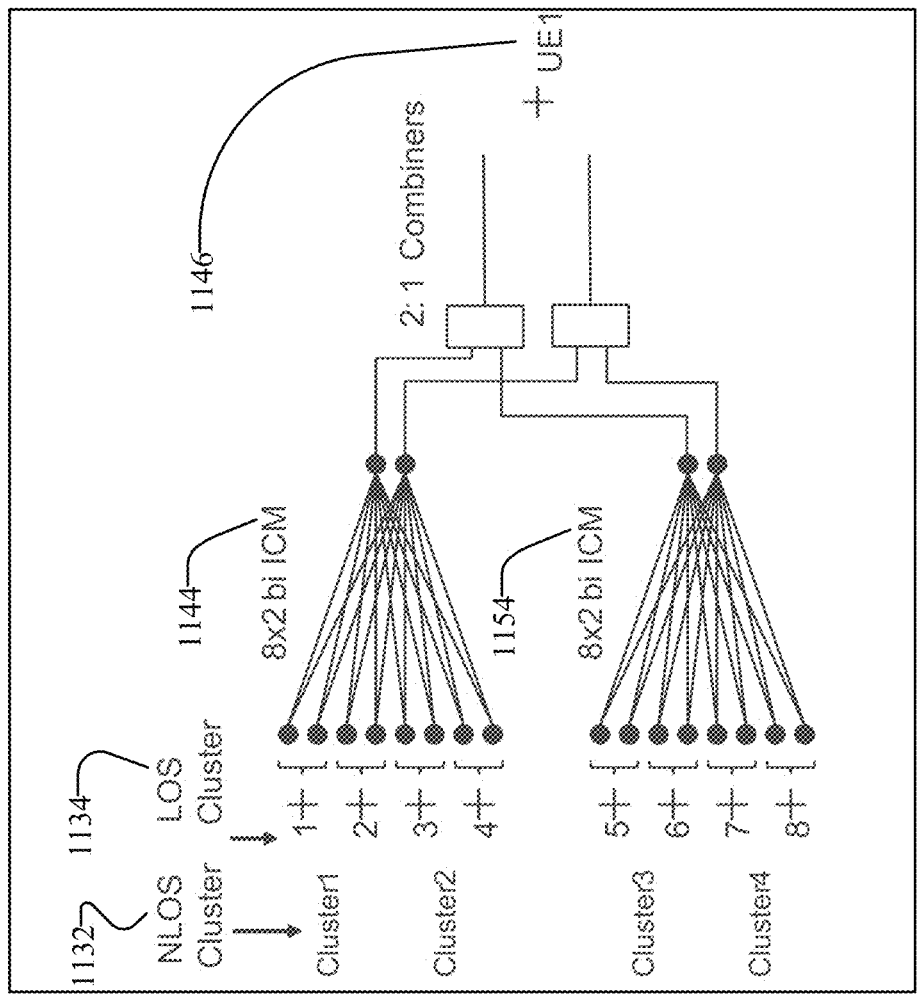
FIG. 11A shows an example system for the use case in which four NLOS clusters or eight LOS clusters beam form to a single UE.

FIG. 11A shows an example system for the use case in which four NLOS clusters 1132 or eight LOS clusters 1134 beam form to a single UE 1146, through two 8×2 bi-directional independent channel models 1144, 1154. For this example case, the probes and UE are assumed to be + to + and the model may vary. Like polarizations see unit gain: vertical to vertical (V2V) and horizontal to horizontal (H2H). Cross polarizations are reduced by XPR dB—for vertical to horizontal (V2H) and horizontal to vertical (H2V) orientations. Therefore, some links are attenuated by XPR dB below the V2V and H2H unit gains. The first cluster is normalized to unit gain; additional clusters follow the power delay profile (PDP) using channel emulator relative power. Each link can support multiple taps using the same probes, which defines the spatial characteristics observed at the BS, and the UE could see unique clusters. In this example case, the tap powers see a common relative link power. Also, a NLOS cluster could support taps that include LOS clusters that are different on each probe. When summed, there is a drop in power level since some links are set below the PDP value due to XPR and weaker taps in the PDP. FIG. 11B shows details for the two 8×2 bi-directional independent channel models 1144, 1154, which are also referred to as faders. For time division duplexing (TDD), the colors represent the same channel condition in both directions. FIG. 11B shows example CE paths with colors representing bi-directional independent channels in the faders.

Figure 12B:
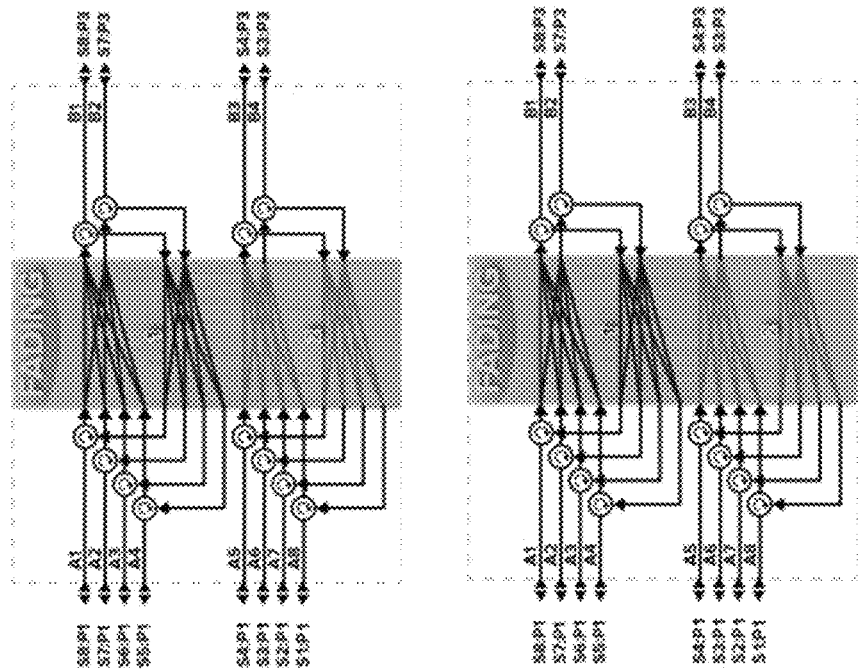
FIG. 12B shows details for the two dual 4×2 bi-directional independent channel models, with colors representing bi-directional independent channels in the faders.
Figure 12A:
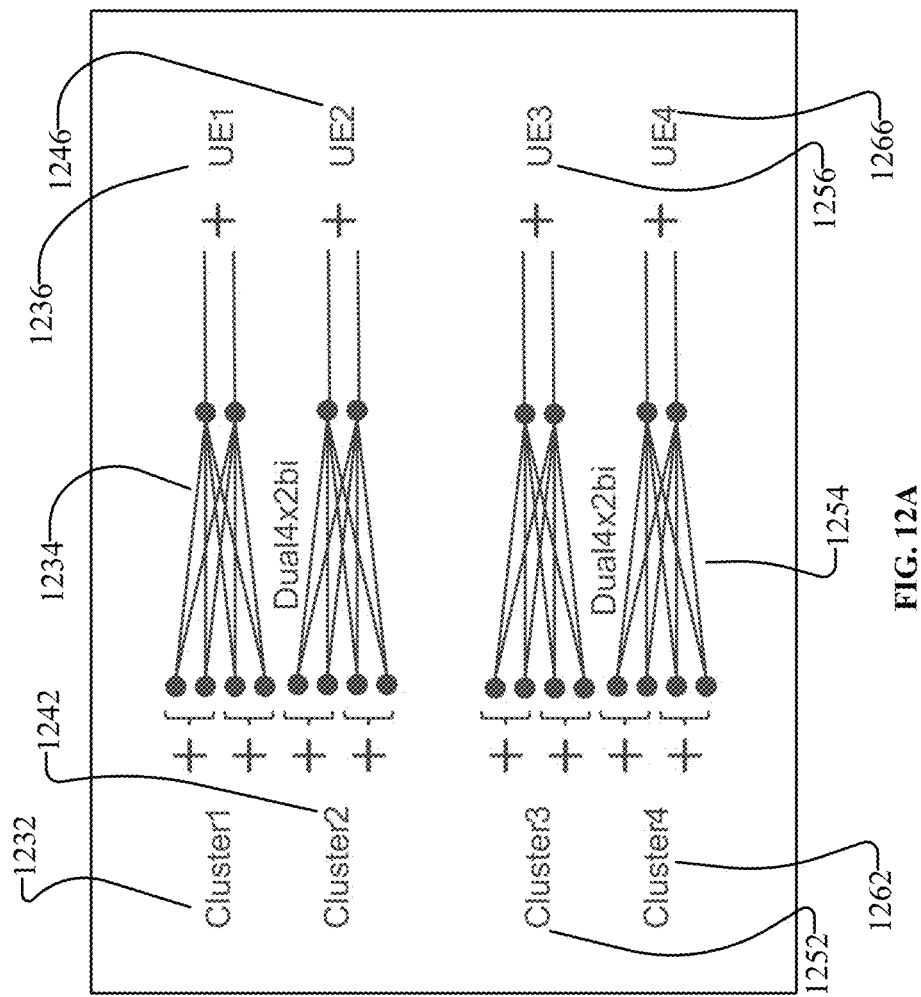
FIG. 12A shows another example of phase matrix beam forming with a use case in which each of four NLOS clusters are directed to a single UE through two dual 4×2 bi-directional independent channel models.

FIG. 12A shows another example of phase matrix beam forming with a use case in which each of four NLOS clusters 1232, 1242, 1252, 1262 are directed to a single UE 1236, 1246, 1256, 1266, through two dual 4×2 bi-directional independent channel models 1234, 1254. For this example case, the probes and UE are assumed to be + to +. FIG. 12B shows details for the two dual 4×2 bi-directional independent channel models 1234, 1254, with colors representing bi-directional independent channels in the faders.

Figure 13A:
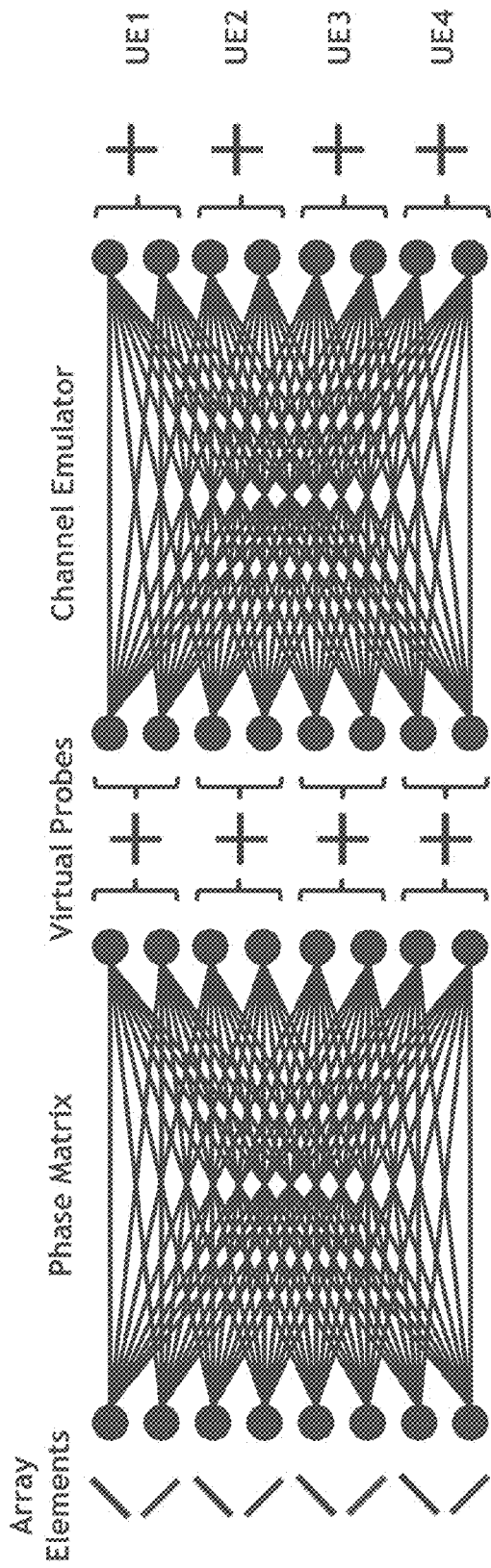
FIG. 13A illustrates the disclosed model using combined phase matrix and channel emulator for emulating signals from a massive MIMO base station transceiver to a MIMO mobile unit, as dictated by a channel model.

FIG. 13A illustrates the disclosed model using combined phase matrix and channel emulator for emulating signals from a massive MIMO base station transceiver to a MIMO mobile unit, as dictated by a channel model, and from a MIMO mobile unit to a massive MIMO base station transceiver, also as dictated by a channel model. The phase matrix, aka PSM 244, provides beamforming paths to virtual probes, emulating dual polarized probes conductively.

Figure 13B:
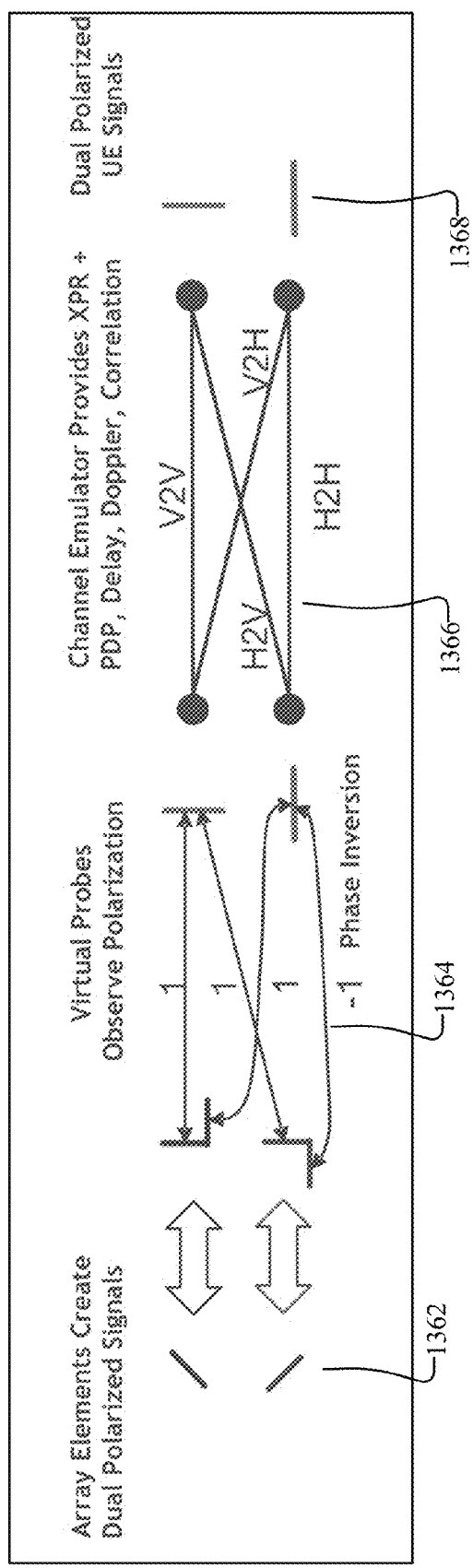
FIG. 13B shows signal orientations for the model shown in FIG. 13A.

FIG. 13B shows signal orientations: array elements create dual polarized signals 1362, virtual probes observe polarization 1364, and channel emulator provides XPR and PDP, delay, Doppler and correlation 1366, resulting in dual polarized UE signals 1368. The disclosed model is bi-directional: dual polarized UE signals can traverse the disclosed model to the massive MIMO base station transceiver, for completing testing.

Computer System

FIG. 14 is a simplified block diagram of an embodiment of a system 1400 that can be used for testing a beamforming antenna array. MIMO array testing can be implemented using a computer program stored in system memory, or stored on other memory and distributed as an article of manufacture, separately from the computer system.

Computer system 1410 typically includes a processor subsystem 1472 which communicates with a number of peripheral devices via bus subsystem 1450. These peripheral devices may include a storage subsystem 1426, comprising a memory subsystem 1422 and a file storage subsystem 1436, user interface input devices 1438, user interface output devices 1478, and a network interface subsystem 1476. The input and output devices allow user interaction with computer system 1410 and network and channel emulators. Network interface subsystem 1474 provides an interface to outside networks and devices of the system 1400. The computer system further includes communication network 1484 that can be used to communicate with user equipment (UE) units; for example, as a device under test.

The physical hardware component of network interfaces are sometimes referred to as network interface cards (NICs), although they need not be in the form of cards: for instance they could be in the form of integrated circuits (ICs) and connectors fitted directly onto a motherboard, or in the form of microcells fabricated on a single integrated circuit chip with other components of the computer system.

User interface input devices 1438 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into computer system 1410.

User interface output devices 1478 may include a display subsystem, a printer, a fax machine, or non-visual displays such as audio output devices. The display subsystem may include a cathode ray tube (CRT), a flat panel device such as a liquid crystal display (LCD) or LED device, a projection device, or some other mechanism for creating a visible image. The display subsystem may also provide non visual display such as via audio output devices. In general, use of the term "output device" is intended to include all possible types of devices and ways to output information from computer system 1410 to the user or to another machine or computer system. The computer system further can include user interface output devices 1478 for communication with user equipment.

Storage subsystem 1426 stores the basic programming and data constructs that provide the functionality of certain embodiments of the present invention. For example, the various modules implementing the functionality of certain embodiments of the invention may be stored in a storage subsystem 1426. These software modules are generally executed by processor subsystem 1472.

Storage subsystem 1426 typically includes a number of memories including a main random access memory (RAM) 1434 for storage of instructions and data during program execution and a read only memory (ROM) 1432 in which fixed instructions are stored. File storage subsystem 1436 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer readable medium such as one or more CD-ROMs, and may be stored by file storage subsystem 1436. The host memory storage subsystem 1426 contains, among other things, computer instructions which, when executed by the processor subsystem 1472, cause the computer system to operate or perform functions as described herein. As used herein, processes and software that are said to run in or on "the host" or "the computer", execute on the processor subsystem 1472 in response to computer instructions and data in the host memory storage subsystem 1426 including any other local or remote storage for such instructions and data.

Bus subsystem 1450 provides a mechanism for letting the various components and subsystems of computer system 1410 communicate with each other as intended. Although bus subsystem 1450 is shown schematically as a single bus, alternative embodiments of the bus subsystem may use multiple busses.

Computer system 1410 itself can be of varying types including a personal computer, a portable computer, a workstation, a computer terminal, a network computer, a television, a mainframe, or any other data processing system or user device. Due to the ever changing nature of computers and networks, the description of computer system 1410 depicted in FIG. 14 is intended only as a specific example for purposes of illustrating embodiments of the present invention. Many other configurations of computer system 1410 are possible having more or less components than the computer system depicted in FIG. 14.

Some Particular Implementations

In one implementation the disclosed technology includes a method of phase and amplitude calibration of a signal generation path that emulates interaction between a massive MIMO antenna array and a MIMO mobile unit. This method includes calibration of programmable radio phase shifter and combining matrix (abbreviated PSM, for phase shifter matrix) in series with a channel emulator. The PSM calibration method includes path-by-path phase calibration of multiple channels of signals that are passed through a channel emulator and onto antennas of the MIMO mobile unit. The PSM calibration is performed straight-through on individual active channels without using the channel emulator to mix active channels. The PSM passively shifts phase of each radio signal input routed to each radio signal output, according to input-paired-to-output phase parameters, and passively attenuates each radio signal input routed to each radio signal output, according to input-paired-to-output attenuation parameters. In this context, passively refers to the PSM not having active amplifier components.

The method proceeds with adjusting input amplitude using the channel emulator in an amplitude equalization mode to reduce the amplitude difference to within a predetermined spread. Path-by-path phase calibration of the channel emulator is then performed while the channel emulator is in the amplitude equalization mode.

After sequential equalization, the calibrated system has a known phase performance that can be used to combine coherent signals with phase differences and use the combined signals for testing.

In some implementations, the channel emulator calibration does not require amplitude equalization to support calibration, and so the sequential phase equalization does not involve any amplitude equalization mode.

A vector network analyzer (abbreviated VNA) can be used to characterize the signals during the path-by-path phase calibration of the PSM. Or, an RF network analyzer can be used.

The path-by-path phase calibration of the PSM can be performed without adjusting the channel emulator to balance amplitudes. Similar attenuation or gain can be applied by the channel emulator for all active paths, during the path-by-path phase calibration of the PSM, without equalization.

In some implementations, the multiple channels of signal represent signals presented to antenna elements in an antenna array, which are organized pair wise. The antenna element pairs further have differing polarizations that are essentially orthogonal. The method further includes constructing the virtual probes taking into account interaction between signals having the differing polarizations.

Method implementations of the calibration technology disclosed can be practiced by a system including a processor and memory, coupled to the processor, the memory holding computer program instructions that, when executed on the processor, implement any of the calibration methods disclosed.

A system can further include a pair of switches. One of the switches is between massive MIMO base station transceiver and the PSM. The other is between the channel emulator and a MIMO mobile unit. The switches can be useful in directing signals to a measuring device, such as a VNA or RF network analyzer, for use in calibration.

Method implementations of the calibration technology disclosed can be practiced using a non-transitory computer readable memory including computer program instructions loaded into the memory that, to be executed by computer hardware.

The technology disclosed is used for two way communications between a base station antenna array and one or more MIMO mobile units. To improve clarity, we describe communications in one direction and then the other, beginning with base station to mobile unit.

One method implementation of technology disclosed emulates for testing signals from a massive MIMO base station transceiver to a MIMO mobile unit as dictated by a channel model. In this context, massive refers to between 32 and 2000 individually driven elements in an antenna array connected to the "massive" MIMO base station transceiver. Of course, not all channels need to be tested at the same time.

Practicing this method, at a programmable radio phase shifter and combining matrix (abbreviated PSM, for phase shifter matrix), conductively receiving antenna element driver signals from a massive MIMO base station transceiver and constructing virtual probe signals that represent line-of-sight and multi-pathing from an antenna array of the massive MIMO base station transceiver to a MIMO mobile unit, as dictated by the channel model.

Then, at a channel emulator, combining and applying spatial and temporal correlation to the virtual probe signals for conductive transmission to the mobile unit, thereby implementing the channel model.

The PSM constructs the virtual probe signals from the antenna element driver signals by applying phase shifting and attenuation functions and combining the phase shifted and attenuated driver signals to produce the virtual probe signals at PSM outputs. The method includes conductively relaying channel emulator outputs to antennas of the MIMO mobile unit.

The method can be used to implement various channel models, including a WINNER (wireless world initiative new radio) channel model, a SCM (spatial channel model) or SCME channel model, or an IMT-Advanced channel model. Models described as WINNER models are identified as WINNER, WINNER II and WINNER+. These models can include scenarios for urban, rural, indoors, pedestrian, vehicular and other environments. The can cover a wide scope of propagation scenarios and environments, including indoor-to-outdoor, outdoor-to-indoor, bad urban micro-cell, bad urban macro-cell, feeder link base station (BS) to fixed relay station (FRS), and moving networks BS to mobile relay station (MRS), MRS to mobile station (MS). Further description of channel models can be found in documents such as Darbari, Chapter 5, MIMO Channel Models, in Miron (ed.), Signal processing (March 2010); Heino, D5.3: WINNER+ Final Channel Models (v 1.0, June 2010); and Kyosti, D1.1.2 V1.1, WINNER II Channel Models (November 2007).

In the PSM, the method disclosed can include distributing the antenna element driver signals through first power dividers to phase shifters and then combining phase shifted signals through second power dividers to the PSM outputs. Such capabilities are available in PSMs available from vendors such as Top Young, Haojin Tech and Macom.

Practicing this technology the antenna element driver signals represent signals presented to elements of the antenna array. The antenna elements can be organized pair wise, with antenna element pairs having different polarizations that are essentially orthogonal. The method can further include constructing the virtual probes taking into account interaction between signals having the differing polarizations.

The method can be extended to a system including a processor and memory, coupled to the processor, a PSM coupled in communication with the processor and a channel emulator coupled in communication with the processor. In such a system, the memory holds computer program instructions that, when executed on the processor, implement any of the methods disclosed.

This system can further include a pair of switches, one positioned between the massive MIMO base station transceiver and the PSM and the other between the channel emulator and a MIMO mobile unit. These switches can be used during calibration or system verification.

Method implementations of the upstream and downstream technology disclosed can be practiced using a non-transitory computer readable memory including computer program instructions loaded into the memory that, to be executed by a system including a processor, memory, a PSM and a channel emulator.

The technology also can be described in the mobile to BS signal propagation direction. In this direction, a method of emulating signals from a MIMO mobile unit to a massive MIMO base station transceiver, as dictated by a channel model includes, at a channel emulator, conductively receiving outputs of the MIMO mobile unit and then applying spatial and temporal correlation to separate combined outputs from the MIMO mobile unit as dictated by the channel model, thereby forming virtual probe signals that represent line-of-sight and multi-pathing transmission from the MIMO mobile unit to base station antenna elements.

At a programmable radio phase shifter and combining matrix (abbreviated PSM, for phase shifter matrix), the method includes decomposing the virtual probe signals into components that emulate responses of respective base station antenna elements to individual virtual probe signals, by applying phase and attenuation functions, and combining phase shifted and attenuated components of the virtual probe signals to produce multi-element input signals that emulate responses of the respective base station antenna elements to combined virtual probe signals. Further, conductively relaying the multi-element input signals to the massively MIMO base station transceiver.

As above, the method can be applied to a variety of channel models, the description of which is not repeated here.

The PSM, distribution and combining technology described above applies in both directions of signal propagation.

As above, the method can be extended to a system including a processor and memory, coupled to the processor, a PSM coupled in communication with the processor and a channel emulator coupled in communication with the processor. In such a system, the memory holds computer program instructions that, when executed on the processor, implement any of the methods disclosed.

For purposes of this application, a computer readable media does not include a transitory wave form.

We claim as follows:

1. A method of phase and amplitude calibration of a signal generation path that emulates interaction between a massive MIMO antenna array and a MIMO mobile unit, the method including:
   path-by-path phase calibration of a programmable radio phase shifter and combining matrix (PSM) that passes multiple channels of signals through a channel emulator and onto antennas of the MIMO mobile unit, without using the channel emulator to mix channels;
   the PSM passively shifting a phase of each radio signal input routed to each radio signal output, according to input-paired-to-output phase parameters; and
   then implementing the PSM to path-by-path calibrate a static channel model in the channel emulator without fading.

2. The method of claim 1, further comprising:
   the PSM passively attenuating each radio signal input routed to each radio signal output, according to input-paired-to-output attenuation parameters;
   adjusting an input amplitude using the channel emulator in an amplitude equalization mode to reduce a difference in amplitude to within a predetermined spread; and
   then path-by-path phase calibrating the channel emulator while the channel emulator is in the amplitude equalization mode.

3. The method of claim 1, further comprising:
   after the path-by-path calibration of the PSM and after the calibration of the channel emulator, programming the PSM with a first cascaded phase matrix and programming the channel emulator with a second cascaded phase matrix, such that a resulting phase matrix adheres to a Butler matrix structure while emulating signals from the MIMO mobile unit to a massive MIMO base station transceiver or while emulating signals from the massive MIMO base station transceiver to the MIMO mobile unit.

4. A system including:
   a processor and memory, coupled to the processor, the memory holding computer program instructions that, when executed on the processor, implement the method of claim 1.

5. A non-transitory computer readable memory including:
   computer program instructions loaded into the memory that, when executed by computer hardware, implement the method of claim 1.

6. A method of emulating signals from a massive MIMO base station transceiver to a MIMO mobile unit, the method including:
   at a programmable radio phase shifter and combining matrix (PSM), conductively receiving antenna element driver signals from the massive MIMO base station transceiver and constructing virtual probe signals that represent line-of-sight and multi-pathing from an antenna array of the massive MIMO base station transceiver to the MIMO mobile unit, and then
   at a channel emulator, combining and applying spatial and temporal correlation to the virtual probe signals for conductive transmission to the MIMO mobile unit according to a static channel model without fading;
   the PSM constructing the virtual probe signals from the antenna element driver signals, by applying phase shifting and attenuation functions to produce the virtual probe signals at PSM outputs; and
   conductively relaying channel emulator outputs to antennas of the MIMO mobile unit.

7. A system including:
   a processor and memory, coupled to the processor;
   the PSM coupled in communication with the processor;
   the channel emulator coupled in communication with the processor; and
   the memory holding computer program instructions that, when executed on the processor, implement the method of claim 6.

8. A non-transitory computer readable memory including:
   computer program instructions loaded into the memory that, when executed by a system including a processor, memory, the PSM and the channel emulator, implement the method of claim 6.

9. A method of emulating signals from a MIMO mobile unit to a massive MIMO base station transceiver, the method including:
- at a channel emulator, conductively receiving outputs of the MIMO mobile unit and then applying spatial and temporal correlation to separate combined outputs from the MIMO mobile unit as dictated by a static channel model without fading, thereby forming virtual probe signals that represent line-of-sight and multi-pathing transmission from the MIMO mobile unit to base station antenna elements, and then
- at a programmable radio phase shifter and combining matrix (PSM), decomposing the virtual probe signals into components that emulate responses of respective base station antenna elements to individual virtual probe signals, by applying phase and attenuation functions to produce multi-element input signals that emulate responses of the respective base station antenna elements to combined virtual probe signals; and
- conductively relaying the multi-element input signals to the massive MIMO base station transceiver.

10. A system including:
- a processor and memory, coupled to the processor;
- the PSM coupled in communication with the processor;
- the channel emulator coupled in communication with the processor; and
- the memory holding computer program instructions that, when executed on the processor, implement the method of claim 9.

11. A non-transitory computer readable memory including:
- computer program instructions loaded into the memory that, when executed by a system including a processor, memory, the PSM and the channel emulator, implement the method of claim 9.

12. A method of emulating signals from a massive MIMO base station transceiver to a MIMO mobile unit, the method including:
- at a programmable radio phase shifter and combining matrix (PSM), conductively receiving antenna element driver signals from the massive MIMO base station transceiver and constructing virtual probe signals that represent line-of-sight and multi-pathing from an antenna array of the massive MIMO base station transceiver to the MIMO mobile unit, as dictated by a first cascaded phase matrix, and then
- at a channel emulator, combining and applying spatial and temporal correlation to the virtual probe signals for conductive transmission to the MIMO mobile unit, as dictated by a second cascaded phase matrix,
- wherein a phase matrix, resulting from the first cascaded phase matrix and the second cascaded phase matrix, as respectively implemented by the PSM and the channel emulator to provide phase shifting and channel emulator output, adheres to a Butler matrix structure; and
- conductively relaying channel emulator outputs to antennas of the MIMO mobile unit.

13. The method of claim 12, wherein the phase matrix is a rank X Butler matrix, where X represents a number of layers supported by the MIMO base station, X being an integer.

14. The method of claim 13, wherein X varies between 1 and min (number of transmit antennas currently implemented, number of receive antennas currently implemented).

15. The method of claim 12, wherein the phase matrix that adheres to a Butler matrix structure results in a channel emulator output that is oriented toward an arbitrary point in a three-dimensional (3D) space.

16. The method of claim 15, wherein the 3D space is defined using spherical coordinates.

17. A method of emulating signals from a MIMO mobile unit to a massive MIMO base station transceiver, the method including:
- at a channel emulator, conductively receiving outputs of the MIMO mobile unit and then applying spatial and temporal correlation to separate combined outputs from the MIMO mobile unit as dictated by a second cascaded phase matrix, thereby forming virtual probe signals that represent line-of-sight and multi-pathing transmission from the MIMO mobile unit to base station antenna elements, and then
- at a programmable radio phase shifter and combining matrix (PSM), decomposing the virtual probe signals into components that emulate responses of respective base station antenna elements to individual virtual probe signals, as dictated by a first cascaded phase matrix, to produce multi-element input signals that emulate responses of the respective base station antenna elements to combined virtual probe signals
- wherein a phase matrix, resulting from the first cascaded phase matrix and the second cascaded phase matrix, as respectively implemented by the PSM and the channel emulator to provide phase shifting and channel emulator output, adheres to a Butler matrix structure; and
- conductively relaying the multi-element input signals to the massive MIMO base station transceiver.

18. The method of claim 17, wherein the phase matrix is a rank X Butler matrix, where X represents a number of layers supported by the MIMO base station, X being an integer.

19. The method of claim 18, wherein X varies between 1 and min (number of transmit antennas currently implemented, number of receive antennas currently implemented).

20. A method of phase and amplitude calibration of a signal generation path that emulates interaction between a massive MIMO antenna array and a MIMO mobile unit, the method including:
- path-by-path phase calibration of a first programmable radio phase shifter and combining matrix (PSM) that passes multiple channels of signals through a first channel emulator and onto antennas of the MIMO mobile unit;
- path-by-path phase calibration of a second PSM that passes multiple channels of interference signals through a second channel emulator and onto antennas of the MIMO mobile unit
- wherein the first PSM passively shifts phase of each radio signal input routed to each radio signal output, according to input-paired-to-output phase parameters; and
- then implementing the first PSM to path-by-path phase calibrate the first channel emulator.

21. The method of claim 20, further comprising:
- implementing the second PSM to path-by-path phase calibrate the second channel emulator.

* * * * *